US009332289B2

(12) United States Patent
Yoneda et al.

(10) Patent No.: US 9,332,289 B2
(45) Date of Patent: May 3, 2016

(54) IMAGE VIEWING SYSTEM, RECEIVER MOBILE TERMINAL, IMAGE SERVER, AND IMAGE VIEWING METHOD

(71) Applicant: Panasonic Corporation, Osaka (JP)

(72) Inventors: Aki Yoneda, Hyogo (JP); Kazuki Funase, Osaka (JP); Takahiro Nishi, Nara (JP); Tomokazu Ishikawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 272 days.

(21) Appl. No.: 14/131,079

(22) PCT Filed: May 28, 2013

(86) PCT No.: PCT/JP2013/003374
§ 371 (c)(1),
(2) Date: Jan. 6, 2014

(87) PCT Pub. No.: WO2013/179654
PCT Pub. Date: Dec. 5, 2013

(65) Prior Publication Data
US 2014/0189726 A1 Jul. 3, 2014

Related U.S. Application Data

(60) Provisional application No. 61/653,448, filed on May 31, 2012.

(30) Foreign Application Priority Data

Jul. 25, 2012 (JP) .................................. 2012-165162

(51) Int. Cl.
*G06F 7/04* (2006.01)
*G06F 17/30* (2006.01)
(Continued)

(52) U.S. Cl.
CPC .......... *H04N 21/25816* (2013.01); *H04L 67/06* (2013.01); *H04W 12/08* (2013.01); *H04L 61/6022* (2013.01); *H04L 67/04* (2013.01)

(58) Field of Classification Search
CPC ..... H04N 7/18; H04W 12/08; H04L 61/6022; H04L 67/04

USPC ............................................................ 726/26
See application file for complete search history.

(56) References Cited

U.S. PATENT DOCUMENTS

| 8,271,676 B1* | 9/2012 | Sathiananthan ... H04N 21/2343 709/203 |
| 2008/0313080 A1* | 12/2008 | Vasa ...................... G06Q 20/40 705/44 |

(Continued)

FOREIGN PATENT DOCUMENTS

| JP | 4332707 | 9/2009 |
| JP | 2009-223694 | 10/2009 |

(Continued)

OTHER PUBLICATIONS

M. Steven Wimmer,; A Distributed Approach to Integrated Inquiry and Display for Radiology; Journal of Medical Systems, vol. 15, No. 4, 1991; p. 299-309.*

(Continued)

*Primary Examiner* — Monjour Rahim
(74) *Attorney, Agent, or Firm* — Wenderoth, Lind & Ponack, L.L.P.

(57) ABSTRACT

An image viewing system includes: a first mobile terminal having an image transmitting unit which transmits image data; an ID transmitting unit which transmits, to an image server, a viewing-allowed-terminal ID that identifies a mobile terminal allowed for viewing of the image data; the image server having an obtaining unit which obtains the viewing-allowed-terminal ID and viewing allowance information indicating whether a state of the image data transmitted by the transmitter mobile terminal is a viewing-available state or a viewing-unavailable state and a server memory unit which stores the viewing allowance information and the viewing-allowed-terminal ID; and a second mobile terminal having a first receiving unit which receives the image data and an inquiry unit which makes an inquiry, to the image server, as to whether or not the image data is available for viewing.

18 Claims, 14 Drawing Sheets

(51) Int. Cl.
*H04N 7/16* (2011.01)
*H04N 21/258* (2011.01)
*H04L 29/08* (2006.01)
*H04W 12/08* (2009.01)
*H04L 29/12* (2006.01)

(56) References Cited

U.S. PATENT DOCUMENTS

2009/0261944 A1* 10/2009 Fukuta .............. G06F 17/30035
  340/5.8
2011/0295946 A1  12/2011 Otsuka 2012/0246744 A1* 9/2012 Kagawa .................. G06F 21/10
  726/32

FOREIGN PATENT DOCUMENTS

JP  2011-138434  7/2011
JP  2011-253264  12/2011

OTHER PUBLICATIONS

International Search Report issued Sep. 3, 2013 in corresponding International Application No. PCT/JP2013/003374.

* cited by examiner

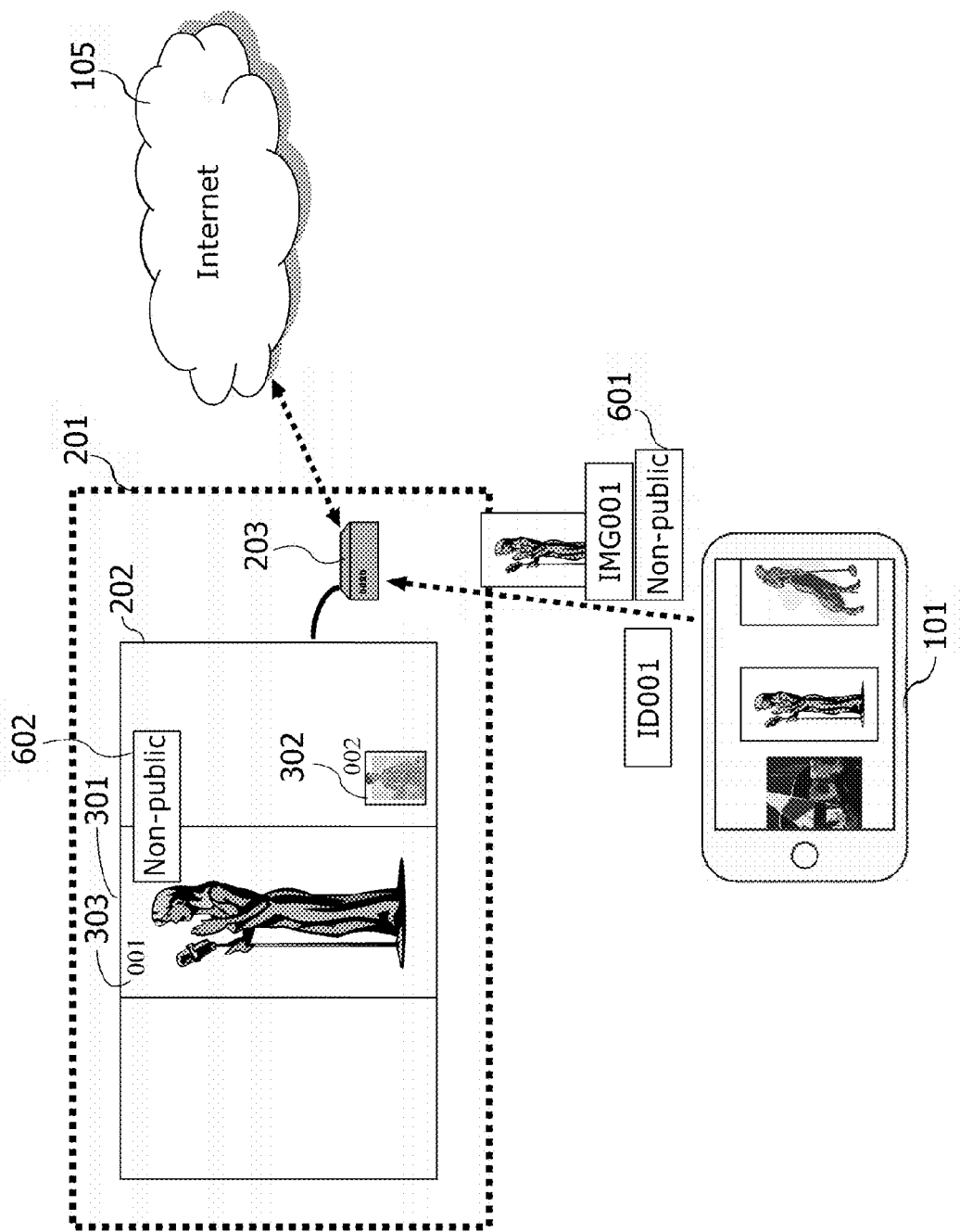

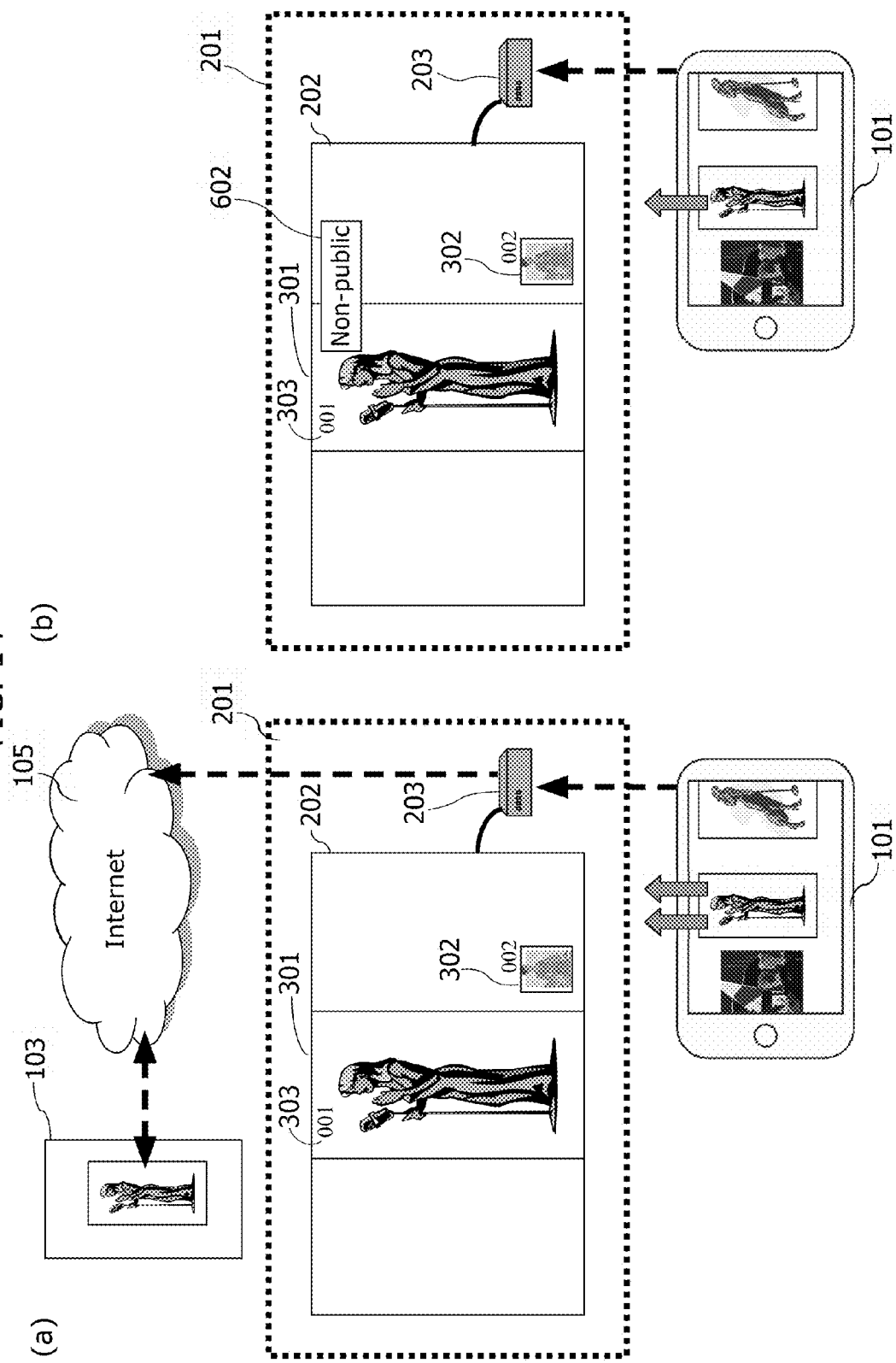

IMAGE VIEWING SYSTEM, RECEIVER MOBILE TERMINAL, IMAGE SERVER, AND IMAGE VIEWING METHOD

TECHNICAL FIELD

The present invention relates to an image viewing system for allowing multiple mobile terminals to share an image stored in a mobile terminal.

BACKGROUND ART

In recent years, mobile terminals known as "smartphones" have become highly popular. A smartphone has not only a simple telephone function, but also functions that a personal computer or the like has conventionally performed, such as shooting with a camera and image viewing. Thus, it is a trend to use a smartphone to do all that has been performed by a personal computer or the like.

Conventionally, when shooting or viewing a digital image, a user shoots the digital image with a digital camera and views the shot digital image on a display of a personal computer. However, both shooting and viewing can be implemented by a single smartphone having both a large display and a high performance camera. Therefore, when such a smartphone is used, the digital image does not need to be transferred from the camera to the personal computer. This convenience meets demands of many people who have thus started using smartphones to shoot and view digital images.

Moreover, a smartphone includes an Internet communication function as standard. Thus, when digital images are to be transferred between smartphones owned by different users, the images can be transmitted and received via the Internet. In this respect, too, smartphones are preferable. When wishing to share digital images stored in the smartphone, the user connects the smartphone to the Internet and uploads the digital images to a server on the Internet. Then, another user connects a smartphone, a different information terminal, or the like of this user to the server and downloads a desired image out of the uploaded digital images. In this way, this digital image can be viewed.

CITATION LIST

Patent Literature

[PTL 1]
Japanese Patent Publication No. 4332707

SUMMARY OF INVENTION

However, when the digital images are shared according to the conventional technique as described above, it is difficult: to manage whether to make a to-be-shared digital image public or private; or to specify a party on the other end to which the digital image is public.

In view of this, the present invention is conceived to solve the above problem and has an object to provide an image viewing system capable of managing whether to make a digital image public or private and easily specifying a desired party only to which the digital image is made public.

In order to achieve the aforementioned object, the image viewing system in an aspect according to the present invention is an image viewing system including: a transmitter mobile terminal including an image transmitting unit which transmits image data; an ID transmitting unit which transmits, to an image server, a viewing-allowed-terminal ID that is set corresponding to the image data and identifies a mobile terminal allowed for viewing of the image data; the image server including (i) an obtaining unit which obtains the viewing-allowed-terminal ID transmitted by the ID transmitting unit and viewing allowance information indicating whether a state of the image data transmitted by the transmitter mobile terminal is a viewing-available state or a viewing-unavailable state and (ii) a server memory unit which stores the viewing allowance information and the viewing-allowed-terminal ID obtained by the obtaining unit; and a receiver mobile terminal including (i) a first receiving unit which receives the transmitted image data and (ii) an inquiry unit which makes an inquiry, to the image server, as to whether or not the image data is available for viewing.

With this, a special advantageous effect can be achieved. More specifically, when the image data stored in the mobile terminal is to be shared, a mobile terminal with which the image data is to be shared can be remarkably easily set without the need to manually input the terminal ID of this mobile terminal.

It should be noted that these general and specific aspects may be implemented as methods.

An image viewing system, a receiver mobile terminal, an image server, and an image viewing method according to the present invention can easily manage whether to make a digital image public or private and easily specify a party to which the digital image is to be public.

BRIEF DESCRIPTION OF DRAWINGS

FIG. 13 is a diagram explaining an operation performed by the image viewing system in Embodiment 3 and showing the case where a digital image that is not wished to be public is viewed via a large display apparatus.

FIG. 14 is a diagram explaining the case where whether or not an image can be made public to an image server is determined according to a type of a gesture input received when a mobile terminal instructs the large display apparatus to display the image.

DETAILED DESCRIPTION OF INVENTION

Underlying Knowledge Forming the Present Invention

Figure 1:
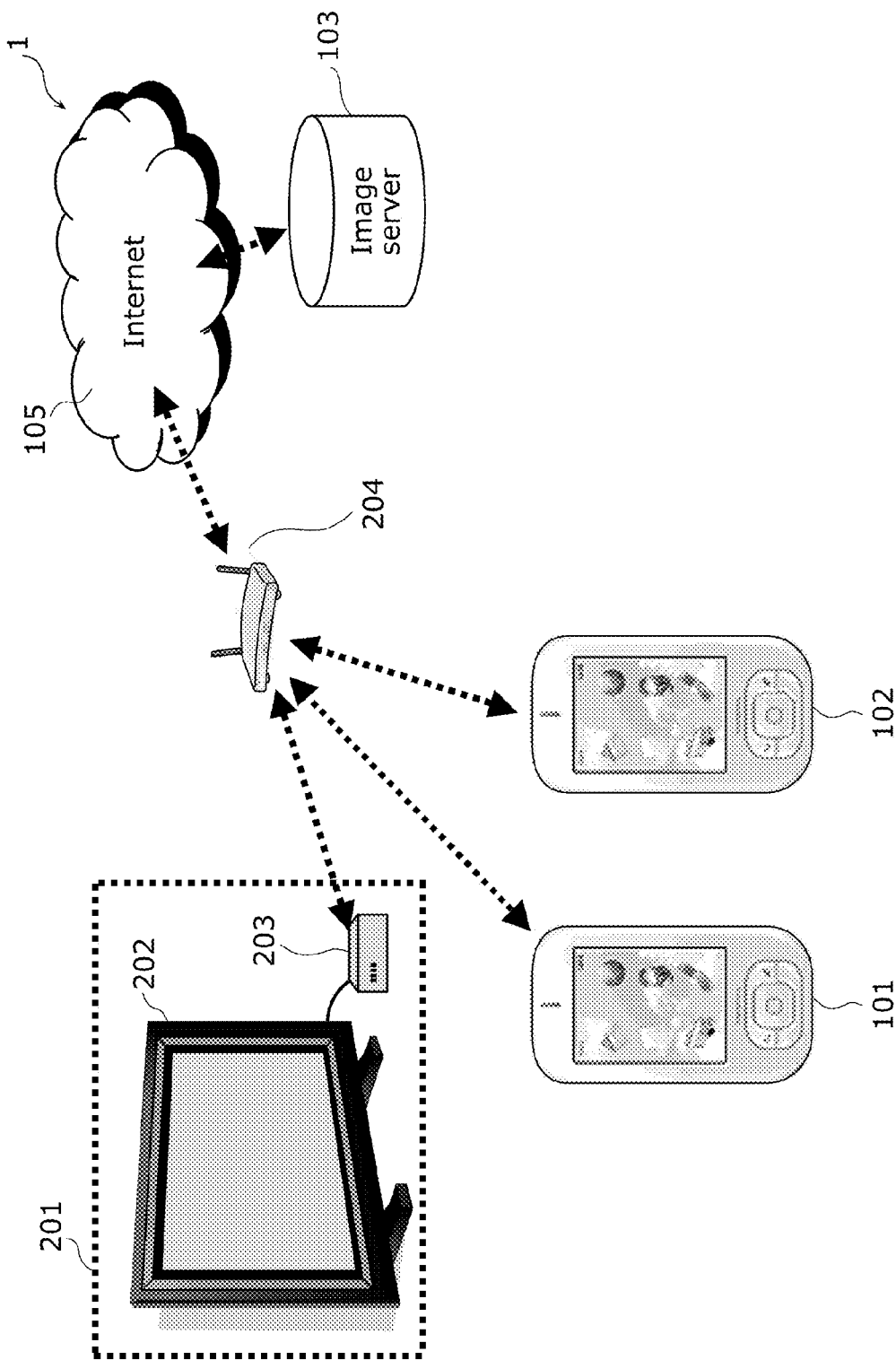
FIG. 1 is a diagram showing one usage pattern of an image viewing system in Embodiment 1.

Sharing of digital images according to the aforementioned conventional technique have various problems. Firstly, in the case where a mobile terminal such as a smartphone is connected to a server on the Internet to download an image, the image cannot be viewed when the user is not present in an environment where the mobile terminal can be connected to a network. For example, when the user is in a basement where radio waves do not reach, the mobile terminal cannot be connected to the network and, for this reason, the image cannot be viewed.

Here, while being in an environment where the mobile terminal can be connected to the Internet, the user may download the desired image and store this image into a memory of the mobile terminal. By doing so, the user can view the image without having to connect the mobile terminal to the Internet. However, when such usage is permitted, a creator of the image (such as a person who shot the image with a camera) may experience a significant trouble. To be more specific, suppose that the creator of the image once sets a state where the image can be viewed by other users (this state is achieved by uploading the image to the server, for example. Hereafter, this state described as a state where the image is made "public"). After setting this state, the user cannot change the state even when wishing to set the image not to be public. This is because the image has been already stored in the memory of the mobile terminal of the other user and it is difficult to restrict the viewing of the image stored in the memory.

Moreover, suppose that although the image is made public via the Internet, the image is to be made public only to a specific person or group. In this case, many troublesome procedures are necessary, such as that a password and an ID need to be shared with a party to which the image is wished to be public. On account of this, when wishing to avoid the troublesome procedures, the user is likely to have to, without much choice, make a choice between making the image public to a large indefinite number of all users or not making the image public.

In order to solve the above problem, an image viewing system in an aspect according to the present invention is an image viewing system including: a transmitter mobile terminal including an image transmitting unit which transmits image data; an ID transmitting unit which transmits, to an image server, a viewing-allowed-terminal ID that is set corresponding to the image data and identifies a mobile terminal allowed for viewing of the image data; the image server including (i) an obtaining unit which obtains the viewing-allowed-terminal ID transmitted by the ID transmitting unit and viewing allowance information indicating whether a state of the image data transmitted by the transmitter mobile terminal is a viewing-available state or a viewing-unavailable state and (ii) a server memory unit which stores the viewing allowance information and the viewing-allowed-terminal ID obtained by the obtaining unit; and a receiver mobile terminal including (i) a first receiving unit which receives the transmitted image data and (ii) an inquiry unit which makes an inquiry, to the image server, as to whether or not the image data is available for viewing.

With this, a special advantageous effect can be achieved. More specifically, when the image data stored in the mobile terminal is to be shared, a mobile terminal with which the image data is to be shared can be remarkably easily set without the need to manually input the terminal ID of this mobile terminal.

Moreover, for example, the receiver mobile terminal may further include: a small display; a receiver input receiving unit which receives a predetermined input causing the small display to display an image indicated by the image data selected by a user; and a display control unit which controls displaying of the image on the small display according to a result of the inquiry, the image being selected by the predetermined input received by the receiver input receiving unit, wherein the inquiry unit may make the inquiry about the image data selected by the predetermined input, and the display control unit may (i) cause the small display to display the image indicated by the image data when the result of the inquiry indicates that the receiver mobile terminal is allowed for viewing of the image data and (ii) not to cause the small display to display the image indicated by the image data when the result of the inquiry indicates that the receiver mobile terminal is not allowed for viewing of the image data.

Furthermore, for example, the receiver mobile terminal may further include a terminal memory unit which stores the image data received by the first receiving unit and the result of the inquiry made about the image data by the inquiry unit, and when the receiver mobile terminal is not connected to a network and the receiver input receiving unit receives the predetermined input, the display control unit may control displaying of the image on the small display according to a latest one of results of the inquiry made about the image data, the image being indicated by the image data and being selected by the predetermined input, and the results being stored in the terminal memory unit.

Moreover, for example, the image server may further include an inquiry result transmitting unit which, when the obtaining unit obtains the inquiry made by the inquiry unit, (i) transmits, to the receiver mobile terminal in response to the inquiry, the result of the inquiry indicating that the image data is available for viewing in a case where the viewing allowance information corresponding to the image data about which the inquiry is made indicates the viewing-available state and a terminal ID of the receiver mobile terminal making the inquiry is included as the viewing-allowed-terminal ID corresponding to the image data, and (ii) transmits, to the receiver mobile terminal in response to the inquiry, the result of the inquiry indicating that the image data is unavailable for viewing in a case where the viewing allowance information corresponding to the image data about which the inquiry is made indicates the viewing-unavailable state or the terminal ID of the receiver mobile terminal making the inquiry is not included as the viewing-allowed-terminal ID corresponding to the image data.

Furthermore, for example, the transmitter mobile terminal may further include: a transmitter input receiving unit which receives an input from a user; and a change information transmitting unit which transmits change information used for changing the state of the image data set in the viewing allowance information from one state to an other state, according to the input received by the transmitter input receiving unit, the obtaining unit may further obtain the change information, and the image server may further include a viewing allowance changing unit which, when the obtaining unit obtains the change information, changes the state of the image data set in the viewing allowance information corresponding to the change information obtained by the obtaining unit, from the one state to the other state.

Moreover, for example, the image transmitting unit may transmit the image data to the image server, and the first receiving unit may receive, via the image server, the image data transmitted by the transmitter mobile terminal.

Furthermore, for example, the image transmitting unit may transmit the image data to the receiver mobile terminal, and the first receiving unit may directly receive the image data transmitted by the transmitter mobile terminal.

Moreover, for example, the transmitter mobile terminal may further include: a determining unit which determines whether or not the image indicated by the image data is allowed to be made public; and a viewing allowance setting unit which (i) sets the state indicated by the viewing allowance information corresponding to the image data to the viewing-available state when a result of the determination made by the determining unit indicates that the image is allowed to be made public, and (ii) sets the state indicated by the viewing allowance information corresponding to the image data to the viewing-unavailable state when a result of the determination made by the determining unit indicates that the image is not allowed to be made public, and the image transmitting unit may further transmit the viewing allowance information corresponding to the image data that is set by the viewing allowance setting unit.

Furthermore, for example, the ID transmitting unit may be included in an independent apparatus separate from the transmitter mobile terminal, the receiver mobile terminal, and the image server, the independent apparatus may further include a second receiving unit which receives, from the transmitter mobile terminal, the image data and the viewing allowance information corresponding to the image data, and the ID transmitting unit may not transmit the image data corresponding to the viewing allowance information when the state indicated by the viewing allowance information received by the second receiving unit indicates the viewing-unavailable state.

Moreover, for example, the transmitter mobile terminal may further include a transmitter input receiving unit which receives a flick input for transmitting the image indicated by the image data selected by a user out of the image data, and the determining unit may determine whether or not the image indicated by the image data is allowed to be made public, according to a total number of regions detected as being touched in the flick input performed for the image data.

Furthermore, for example, the determining unit may determine that (i) the image is allowed to be made public when a region having a high sharpness in the image indicated by the image data exceeds a first predetermined proportion, and (ii) the image is not allowed to be made public when the region having the high sharpness in the image indicated by the image data is smaller than or equal to the first predetermined proportion.

Moreover, for example, the determining unit may determine that (i) the image is allowed to be made public when at least a part of the image indicated by the image data matches a pre-specified image, and (ii) the image is not allowed to be made public when the image indicated by the image data does not match the pre-specified image.

Furthermore, for example, the image server may further store the image data.

Moreover, for example, the ID transmitting unit may be included in an independent apparatus separate from the transmitter mobile terminal, the receiver mobile terminal, and the image server.

Furthermore, for example, the independent apparatus may further include a second receiving unit which receives the image data transmitted by the transmitter mobile terminal, and the ID transmitting unit may transmit, to the image server, each of terminal IDs of all mobile terminals connected to the independent apparatus via a network as the viewing-allowed-terminal ID, when the second receiving unit receives the image data.

Moreover, for example, the transmitter mobile terminal may further include the ID transmitting unit.

It should be noted that these general and specific aspects may be implemented as receiver mobile terminals.

Moreover, note that these general and specific aspects may be implemented as image servers.

Furthermore, note that these general and specific aspects may be implemented as methods.

The following is a specific description of an image viewing system, a receiver mobile terminal, an image server, and an image viewing method in an aspect according to the present invention, with reference to the drawings.

Each of the exemplary embodiments described below shows a general or specific example. The numerical values, shapes, structural elements, steps, the processing order of the steps etc. shown in the following exemplary embodiments are mere examples, and therefore do not limit the scope of the present invention. Therefore, among the structural elements in the following exemplary embodiments, structural elements not recited in any one of the independent claims indicating top concepts according to the present invention are described as arbitrary structural elements.

1. Embodiment 1

An image viewing system 1 in an aspect according to the present invention includes a large display apparatus 201, a first mobile terminal 101 serving as a transmitter mobile terminal, a second mobile terminal 102 serving as a receiver mobile terminal, and an image server 103 which are connected to each other via a network through a wireless LAN station 204.

Figure 2:
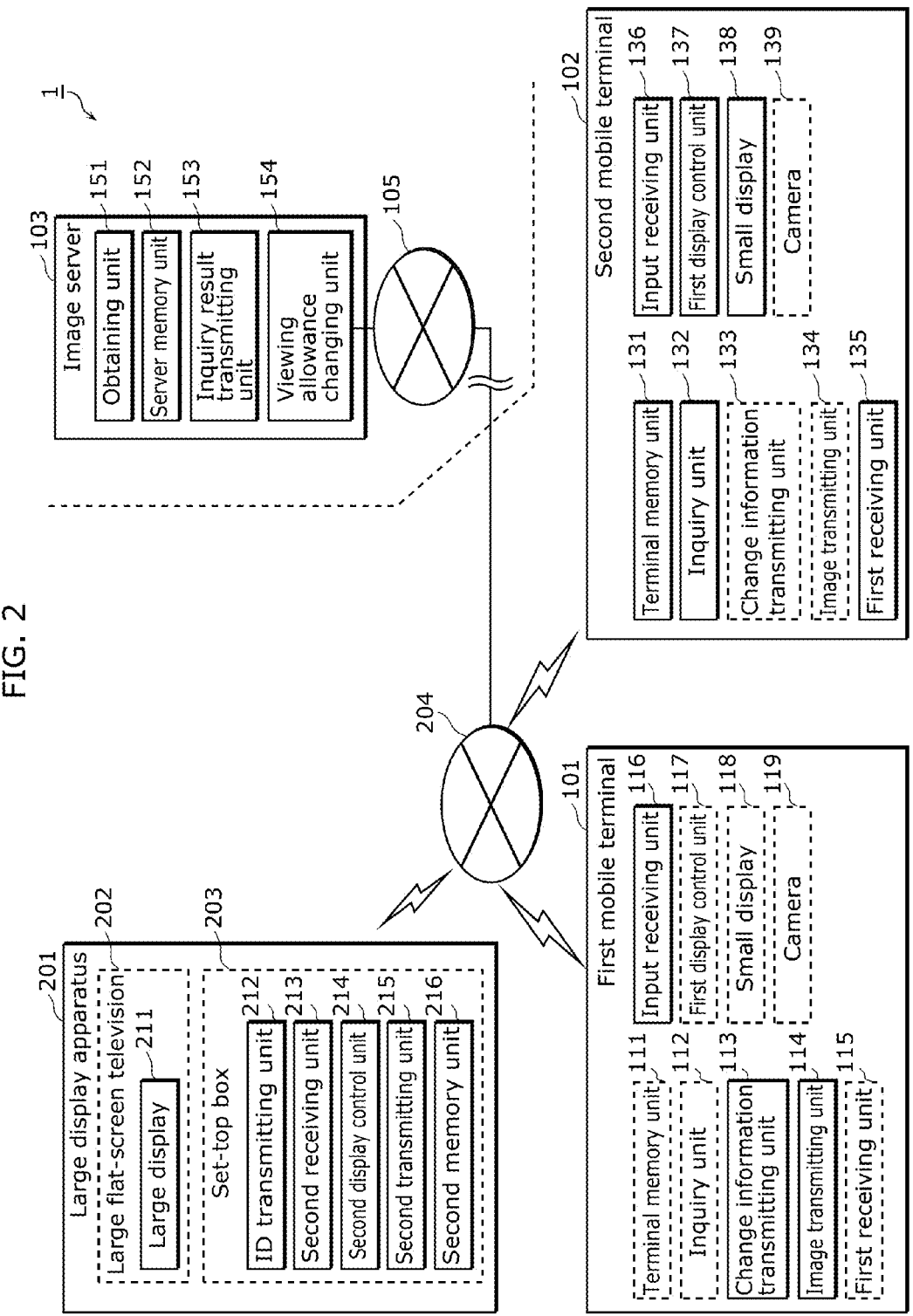
FIG. 2 is a functional block diagram of the image viewing system in Embodiment 1.

FIG. 1 is a diagram showing one usage pattern of the image viewing system in Embodiment 1. FIG. 2 is a functional block diagram of the image viewing system in Embodiment 1.

In Embodiment 1, the large display apparatus 201 includes a general-purpose large flat-screen television 102 and a set-top box 103. As shown in FIG. 2, the large flat-screen television 202 includes a large display 211. The set-top box 203 includes an ID transmitting unit 212, a second receiving unit 213, a second display control unit 214, a second transmitting unit 215, and a second memory unit 216.

The large display 211 is, for example, a liquid crystal display, a plasma display, or an organic electroluminescent (EL) display, and serves as a display unit of a stationary television.

The ID transmitting unit 212 transmits, to the image server 103, a viewing-allowed-terminal ID that is set corresponding to image data and identifies a mobile terminal allowed for viewing of the image data. In Embodiment 1, the ID transmitting unit 212 is included in the set-top box 203 which is independent and different from the first mobile terminal 101 serving as the transmitter mobile terminal, the second mobile terminal 102 serving as the receiver mobile terminal, and the image server 103. When the second receiving unit 213 receives image data, the ID transmitting unit 212 is connected to the set-top box 203 via a network constructed by the wireless LAN station 204 described later. Then, the ID transmitting unit 212 obtains, as the viewing-allowed-terminal ID, a terminal ID for each of all mobile terminals recognized by the set-top box 203 and transmits the obtained terminal IDs to the image server 103.

Here, "when the second receiving unit 213 receives image data", the term "when" used here includes not only the timing at which or a period of time during which the second receiving unit 213 receives the image data from the transmitter mobile terminal (the first mobile terminal 101 in Embodiment 1), but also a predetermined period of time with respect to the timing at which the second receiving unit 213 receives the image data from the first mobile terminal 101. The "predetermined period of time" refers to, for example, a period of time during which the set-top box 203 activates an application for causing the large flat-screen television 202 to display an image indicated by the image data received by the second receiving unit 213.

The second receiving unit 213 receives the image data transmitted by the first mobile terminal 101 serving as the transmitter mobile terminal. Moreover, the second receiving unit 213 receives an instruction for displaying, on the large display 211, an image transmitted by the first mobile terminal 101 or the second mobile terminal 102.

The second display control unit 214 causes the large display 211 to display the image according to the instruction issued by the first mobile terminal 101 or the second mobile terminal 102.

The second transmitting unit 215 transfers the image data received by the second receiving unit 213 to the image server 103.

The second memory unit 216 temporarily stores the image data received by the second receiving unit 213 and the viewing-allowed-terminal ID obtained by the ID transmitting unit 212.

In Embodiment 1, the large display apparatus 201 includes the large flat-screen television 202 and the set-top box 203. However, the configuration of the large display apparatus 201 is not limited to this. The large display apparatus 201 may include one integral unit that serves the function of the large flat-screen television 202 and the function of the set-top box 203. In other words, the large display apparatus 201 may be configured with a single device or a combination of multiple devices.

Each of the first mobile terminal 101 and the second mobile terminal 102 is portable to be held by the user mainly with one hand. The first mobile terminal 101 includes a terminal memory unit 111, an inquiry unit 112, a change information transmitting unit 113, an image transmitting unit 114, a first receiving unit 115, an input receiving unit 116, a first display control unit 117, a small display 118, and a camera 119. The second mobile terminal 102 includes a terminal memory unit 131, an inquiry unit 132, a change information transmitting unit 133, an image transmitting unit 134, a first receiving unit 135, an input receiving unit 136, a first display control unit 137, a small display 138, and a camera 139. It should be noted that since the structural elements included in the first mobile terminal 101 are the same as those included in the second mobile terminal 102, only the structural elements included in the first mobile terminal 101 are described.

The terminal memory unit 111 is, for example, an internal flash memory in which image data can be accumulated. To be more specific, the terminal memory unit 111 stores at least one of image data received by the first receiving unit 115 and image data captured by the camera 119. Moreover, the terminal memory unit 111 stores a result of an inquiry made by the inquiry unit 112 concerning the image data (as described later), together with the image data received by the first receiving unit 115.

The inquiry unit 112 makes an inquiry, to the image server 103, as to whether or not the image data received by the first receiving unit 115 is available for viewing. The inquiry unit 112 makes the inquiry about the image data selected according to an input received by the input receiving unit 116.

According to the input received by the input receiving unit 116, the change information transmitting unit 113 transmits change information used for changing a state of the image data set in viewing allowance information, from one state to the other state. Here, the "viewing allowance information" refers to information set in advance by the user concerning the image data and indicates the state whether the image data is in a viewing-available state or a viewing-unavailable state. To be more specific, when the user enters an input to the input receiving unit 116 to change the viewing allowance information, the change information transmitting unit 113 transmits, to the image server, the change information used for changing the state indicated by the viewing allowance information. With this, the user can make public the image corresponding to the viewing allowance information by setting the state indicated by the viewing allowance information to the viewing-available state. Similarly, the user can make private the image corresponding to the viewing allowance information by setting the state indicated the viewing allowance information to the viewing-unavailable state.

The image transmitting unit 114 transmits the image data stored in the terminal memory unit 111. To be more specific, when the input receiving unit 116 receives an input entered by the user to cause the large display 211 to display the image data stored in the terminal memory unit 111 of the first mobile terminal 101, the image transmitting unit 114 transmits an instruction for causing the large display 211 to display the image data, together with the image data selected according to the input. In Embodiment 1, the image data transmitted by the image transmitting unit 114 is received by the second receiving unit 213 of the set-top box 203, and is transferred to the image server 103 by the second transmitting unit 215. This means that, as a result, the image transmitting unit 114 transmits the image data to the image server 103 via the set-top box 203. It should be noted that the image transmitting unit 114 does not need to transmit the image data to the image server 103 via the set-top box 203, and may transmit the image data directly to the image server 103. More specifically, in this case, the image transmitting unit 114 transmits the image data to both the set-top box 203 and the image server 103. Moreover, in this case, the second transmitting unit 215 of the set-top box 203 does not need to transfer the image data received by the second receiving unit 213 to the image server 103.

The first receiving unit 115 receives image data transmitted by another mobile terminal. In Embodiment 1, for example, the image data transmitted by the image transmitting unit 114 of the first mobile terminal 101 is received by the first receiving unit 135 of the second mobile terminal 102 via the set-top box 203 and the image server 103.

The input receiving unit 116 receives an input that is set in advance to cause the small display 118 to display an image indicated by the image data selected by the user.

On the basis of a result of the inquiry, the first display control unit 117 performs control for displaying, on the small display 118, the image selected according to the preset input received by the input receiving unit 116. Moreover, when the result of the inquiry indicates that the current mobile terminal (the first mobile terminal 101) is allowed for viewing of the image data, the first display control unit 117 causes the small display 118 to display the image indicated by this image data. On the other hand, when the result of the inquiry indicates that the current mobile terminal is not allowed for viewing of the image data, the first display control unit 117 does not cause the small display to display the image indicated by the image data. Moreover, suppose that the current mobile terminal is not connected to the network and that the input receiving unit 116 receives the preset input. In this case, on the basis of the latest result among the results of the inquiry made about the current image data stored in the terminal memory unit 111, the first display control unit 117 performs control for displaying, on the small display 118, the image indicated by the image data selected according to this preset input.

To be more specific, suppose for example that the second mobile terminal 102 receives the image data transmitted by the first mobile terminal 101 and that the user intends to view an image indicated by the image data using the second mobile terminal 102. In this case, the inquiry unit 132 of the second mobile terminal 102 makes an inquiry to the image server 103 as to whether or not the current image data is available for viewing. When the result of this inquiry indicates that the second mobile terminal 102 is allowed for viewing of the image, the first display control unit 137 of the second mobile terminal 102 causes the small display 138 to display the image indicated by the current image data. On the other hand, when the result of this inquiry indicates that the second mobile terminal 102 is not allowed for viewing of the image, the first display control unit 137 of the second mobile terminal 102 does not cause the small display 138 to display the image indicated by the current image data. Moreover, the second mobile terminal 102 stores the result of the inquiry made by the inquiry unit 132 into the terminal memory unit 131. Thus, when the second mobile terminal 102 is not connected to the network, the second mobile terminal 102 makes the determination as described above based on the basis of the latest result among the results of the inquiry and causes or does not cause the small display 138 to display the image data. Here, the terminal memory unit 131 may accumulate and store all the results of the inquiry having been made by the inquiry unit 132 or may store only the latest result. Alternatively, the terminal memory unit 131 may accumulate and store a predetermined number of latest results.

The small display 118 is a liquid crystal display or an organic EL display. The small display 118 and the input receiving unit 116 serve as a touch display.

Using a wireless LAN signal, the wireless LAN station connects the first mobile terminal 101, the second mobile terminal 102, and the large display apparatus 201 to a network based on the Internet protocol. However, the configuration to connect the first mobile terminal 101, the second mobile terminal 102, and the large display apparatus 201 to the network is not limited to this. The large display apparatus 201 and the wireless LAN station 204 may be configured as one integral apparatus.

The image server 103 is connected, via the Internet 105, to a network constructed by the wireless LAN station 204. Moreover, the image server 103 manages: image data used for sharing image data by a plurality of mobile terminals, the image data being stored in the mobile terminals; or information concerning the image data. In Embodiment 1, the image server 103 is used by the first mobile terminal 101 and the second mobile terminal 102 to share the image data.

The image server 103 includes an obtaining unit 151, a server memory unit 152, an inquiry result transmitting unit 153, and a viewing allowance changing unit 154.

The obtaining unit 151 obtains: the viewing allowance information indicating whether the image data transmitted by the first mobile terminal 101 serving as the transmitter is in the viewing-available state or the viewing-unavailable state; and the viewing-allowed-terminal ID transmitted by the ID transmitting unit 212 of the set-top box 203. Moreover, the obtaining unit 151 obtains the change information transmitted by the change information transmitting unit 113.

The server memory unit 152 stores the viewing allowance information and the viewing-allowed-terminal ID obtained by the obtaining unit 151.

Suppose that: the obtaining unit 151 obtains an inquiry from the inquiry unit 132; the viewing allowance information corresponding to the image data that is a subject of the inquiry indicates the viewing-available state; and the terminal ID of the second mobile terminal 102 serving as the receiver making the inquiry is included as the viewing-allowed-terminal ID corresponding to the image data. In this case, the inquiry result transmitting unit 153 transmits an inquiry result indicating that the image data is available for viewing, to the second mobile terminal 102 in response to the inquiry. Similarly, suppose that: the obtaining unit 151 obtains an inquiry from the inquiry unit 132; and the viewing allowance information corresponding to the image data that is a subject of the inquiry indicates the viewing-unavailable state or the terminal ID of the second mobile terminal 102 serving as the receiver making the inquiry is not included as the viewing-allowed-terminal ID corresponding to the image data. In this case, the inquiry result transmitting unit 153 transmits an inquiry result indicating that the image data is unavailable for viewing, to the second mobile terminal 102 in response to the inquiry.

When the obtaining unit 151 obtains change information, the viewing allowance changing unit 154 changes the state of the image data set in the viewing allowance information corresponding to the change information obtained by the obtaining unit 151, from one state to the other state. To be more specific, when the obtaining unit 151 obtains the change information transmitted as a result of a user operation performed on the mobile terminal 101 serving as the transmitter, the viewing allowance changing unit 154 changes the state of the image data indicated in the viewing allowance information from the viewing-available state to the viewing-unavailable state. Here, the "change information" refers to, for example, information used for changing the state indicated in the viewing allowance information concerning the image data already stored in the image server 103, from the viewing-available state to the viewing-unavailable state.

Each of the mobile terminals 101 and 102 shown in FIG. 1 has sufficient performance when just one user is to view an image indicated by the image data (referred to as the "digital image" hereafter). However, when multiple users are to view the digital image displayed on one mobile terminal, the display is too small and this is not so preferable. With this being the situation, in the image viewing system in Embodiment 1, each of the mobile terminals 101 and 102 can instruct the large display apparatus 201 connected via a wireless LAN to display the digital image. According to this instruction, the second display control unit 214 of the set-top box 203 included in the large display apparatus 201 causes the large display 211 of the large flat-screen television 202 to display the digital image. As a result, the digital image of the mobile terminal is displayed on the large display 211. Therefore, the multiple users can enjoy viewing a photograph on the large display 211 having a large screen. Here, not only one mobile terminal but also all the connected mobile terminals (the first mobile terminal 101 and the second mobile terminal 102 in Embodiment 1) can instruct the large display apparatus 201 to display the digital image. Moreover, in the following operations performed by the image viewing system 1 in Embodiment 1, the first mobile terminal 101 is described as a mobile terminal serving as the transmitter mobile terminal and the second mobile terminal 102 is described as a mobile terminal serving as the receiver mobile terminal, for convenience of explanation. To be more specific, since the first mobile terminal 101 serving as the transmitter mobile terminal can explain an aspect according to the present invention, the structural elements indicated by the dashed lines in the block diagram shown in FIG. 2 are not essential. Moreover, since the second mobile terminal 102 serving as the receiver mobile terminal can explain an aspect according to the present invention, the structural elements indicated by the dashed lines in the block diagram shown in FIG. 2 are not essential. However, the above configuration is not intended to be limiting. Thus, it is preferable for both the structural elements indicated by the solid lines and the structural elements indicated by the dashed lines in FIG. 2 to be the structural elements of the first mobile terminal 101 and the second mobile terminal 102.

The operations performed by the image viewing system according to Embodiment 1 configured as described are shown in FIG. 3 to FIG. 6.

Figure 3:
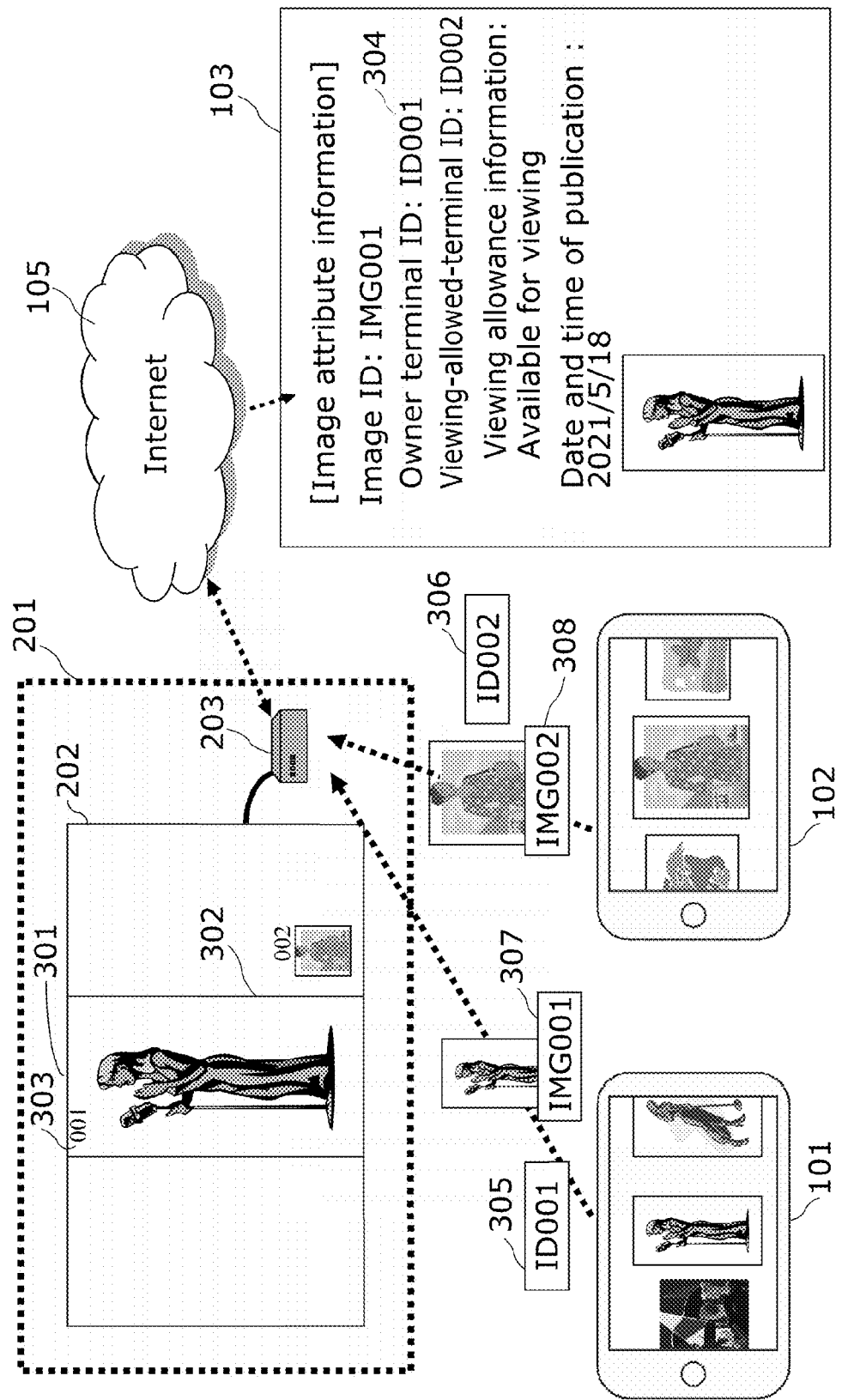
FIG. 3 is a diagram explaining an operation performed by a large display apparatus when a mobile terminal instructs the large display apparatus to display a digital image.
Figure 4:
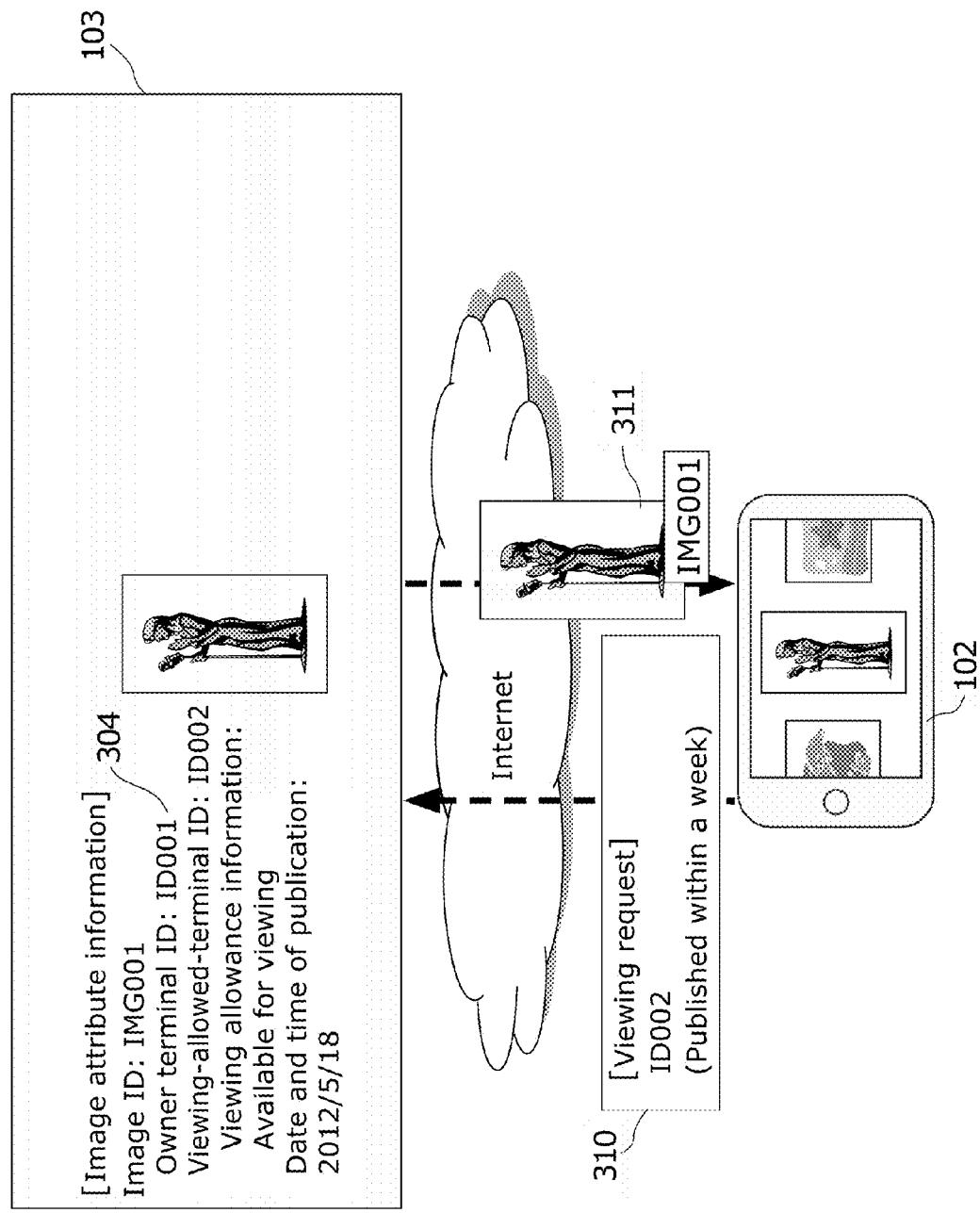
FIG. 4 is a diagram explaining an operation performed between the mobile terminal and an image server after the digital image is shared in the image viewing system.
Figure 5:
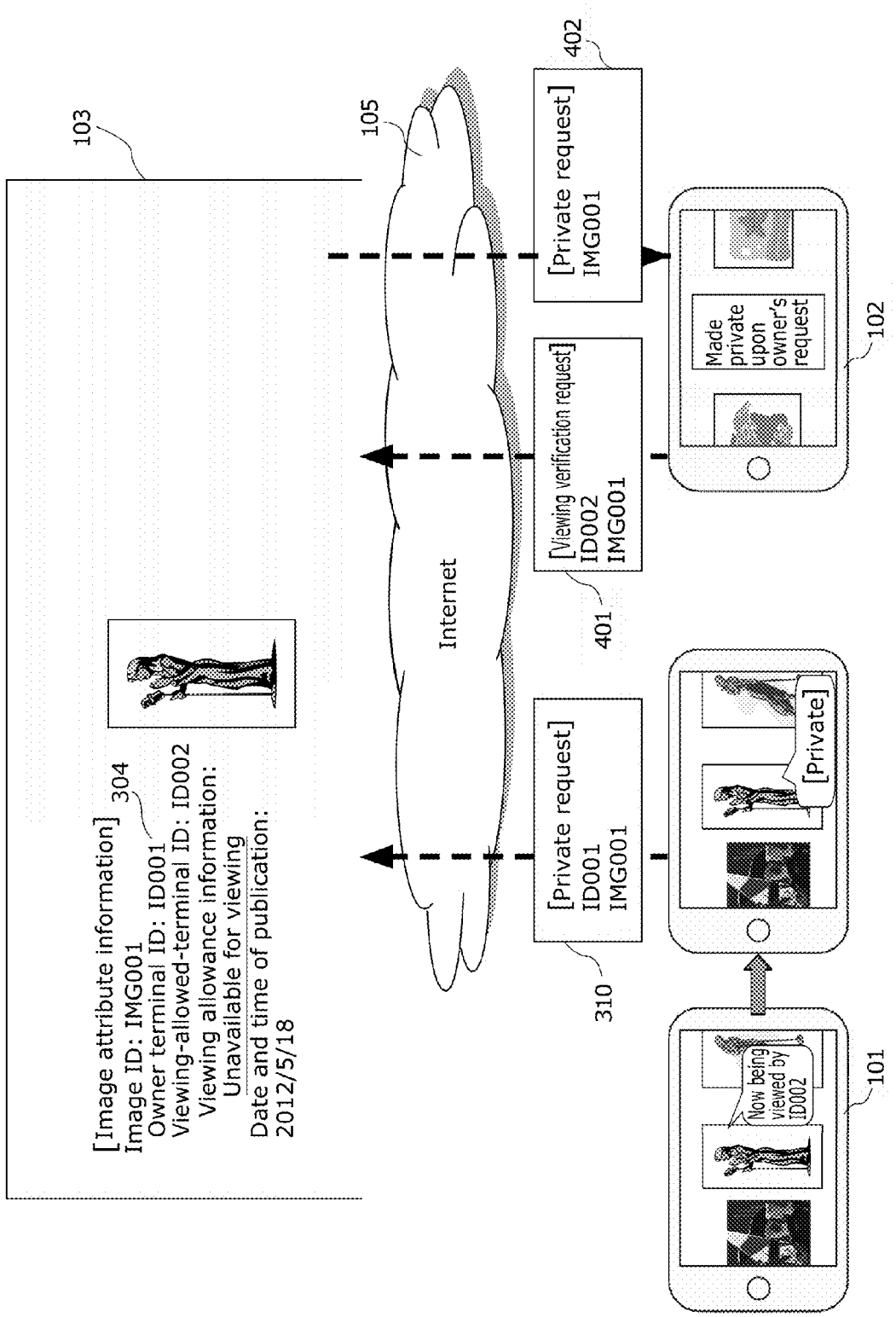
FIG. 5 is a diagram explaining an operation performed by the image viewing system when a first mobile terminal transmits a private request.
Figure 7:
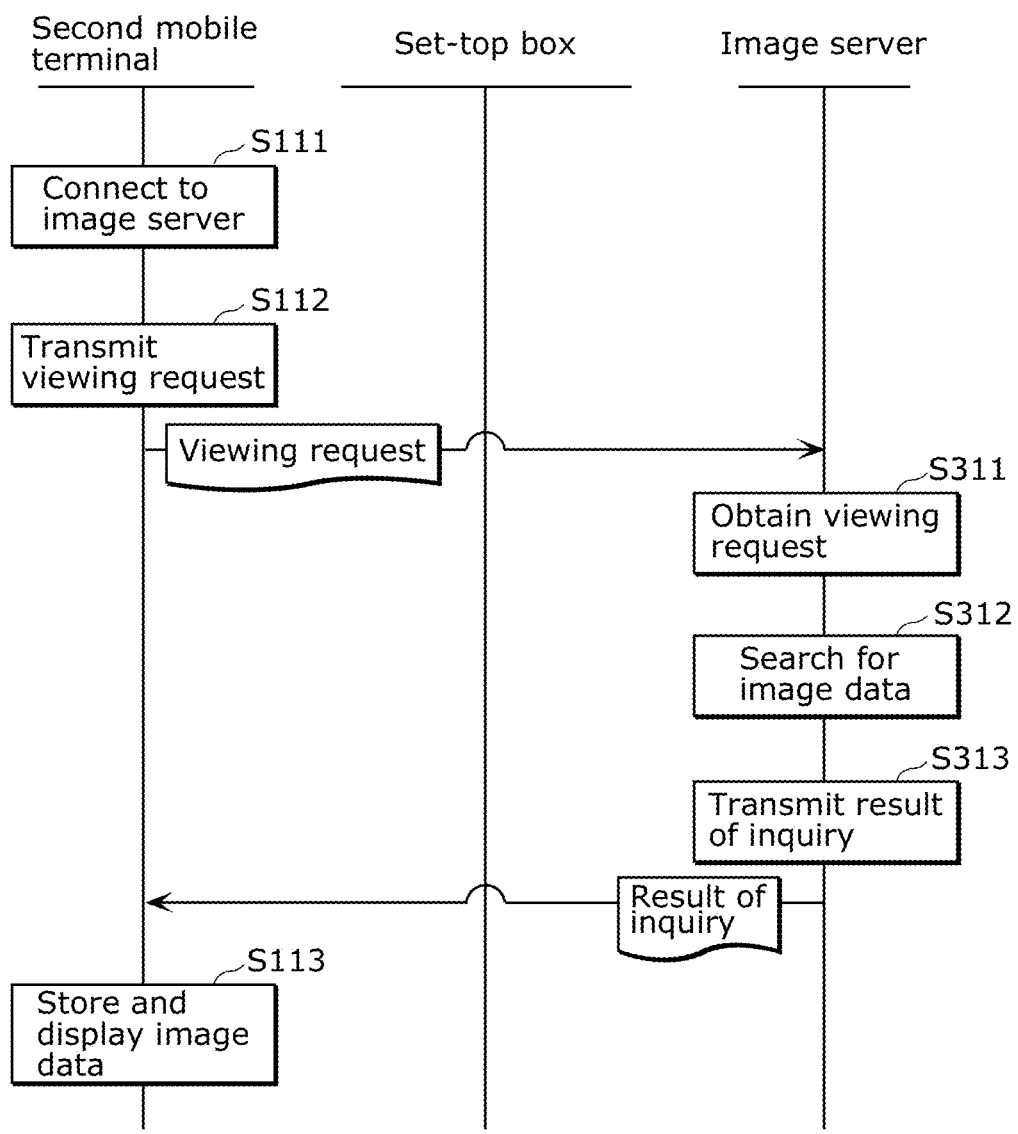
FIG. 7 is a sequence diagram showing an operation performed by the image viewing system.
Figure 8:
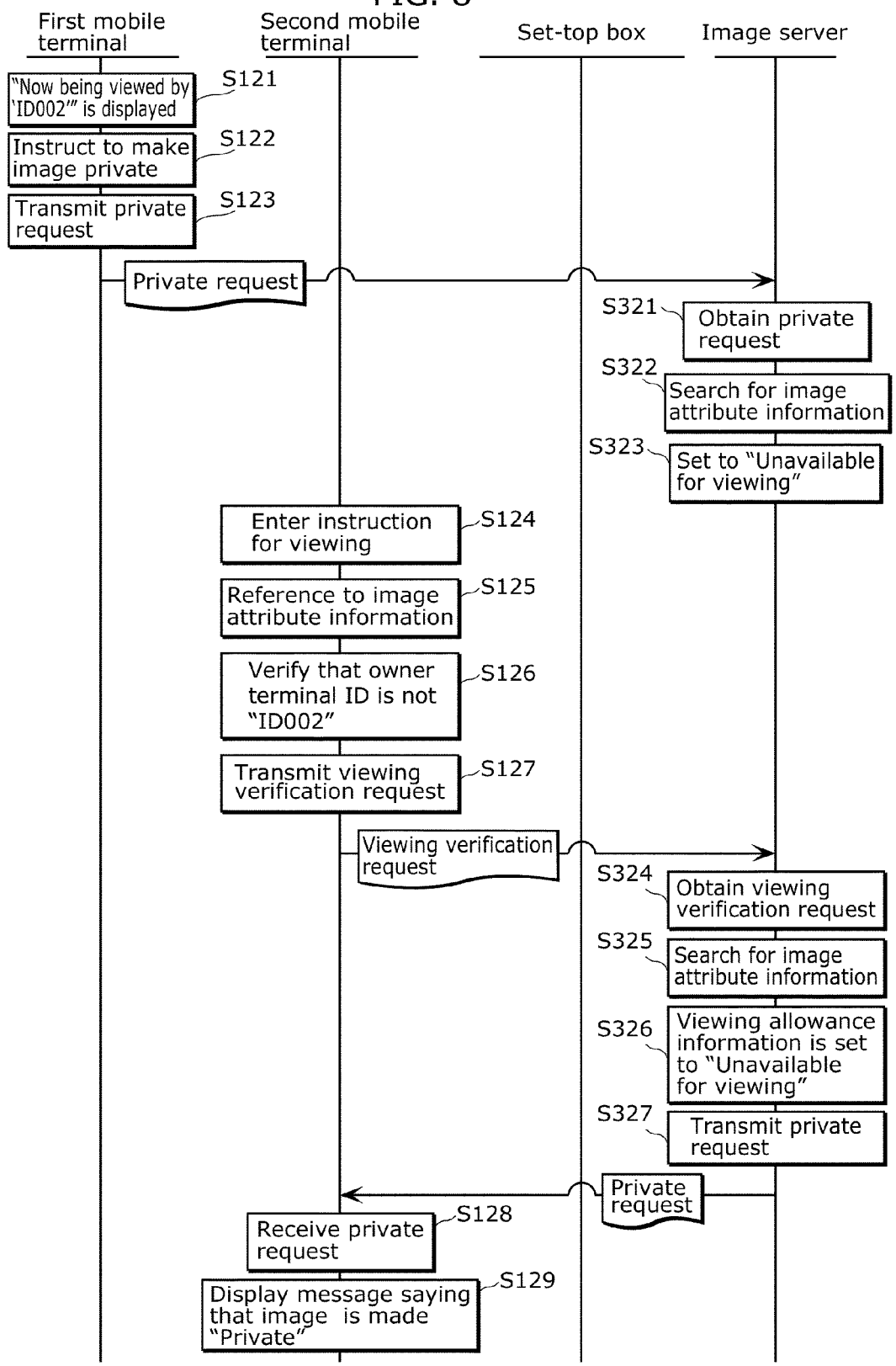
FIG. 8 is a sequence diagram showing an operation performed by the image viewing system.

FIG. 3 is a diagram explaining an operation performed by the large display apparatus when the mobile terminal instructs the large display apparatus to display a digital image. FIG. 4 is a diagram explaining an operation performed between the mobile terminal and the image server after a digital image is shared in the image viewing system. FIG. 5 is a diagram explaining an operation performed by the image viewing system when the first mobile terminal transmits a private request. Each of FIG. 6 to FIG. 8 is a sequence diagram showing the operation performed by the image viewing system.

Figure 6:
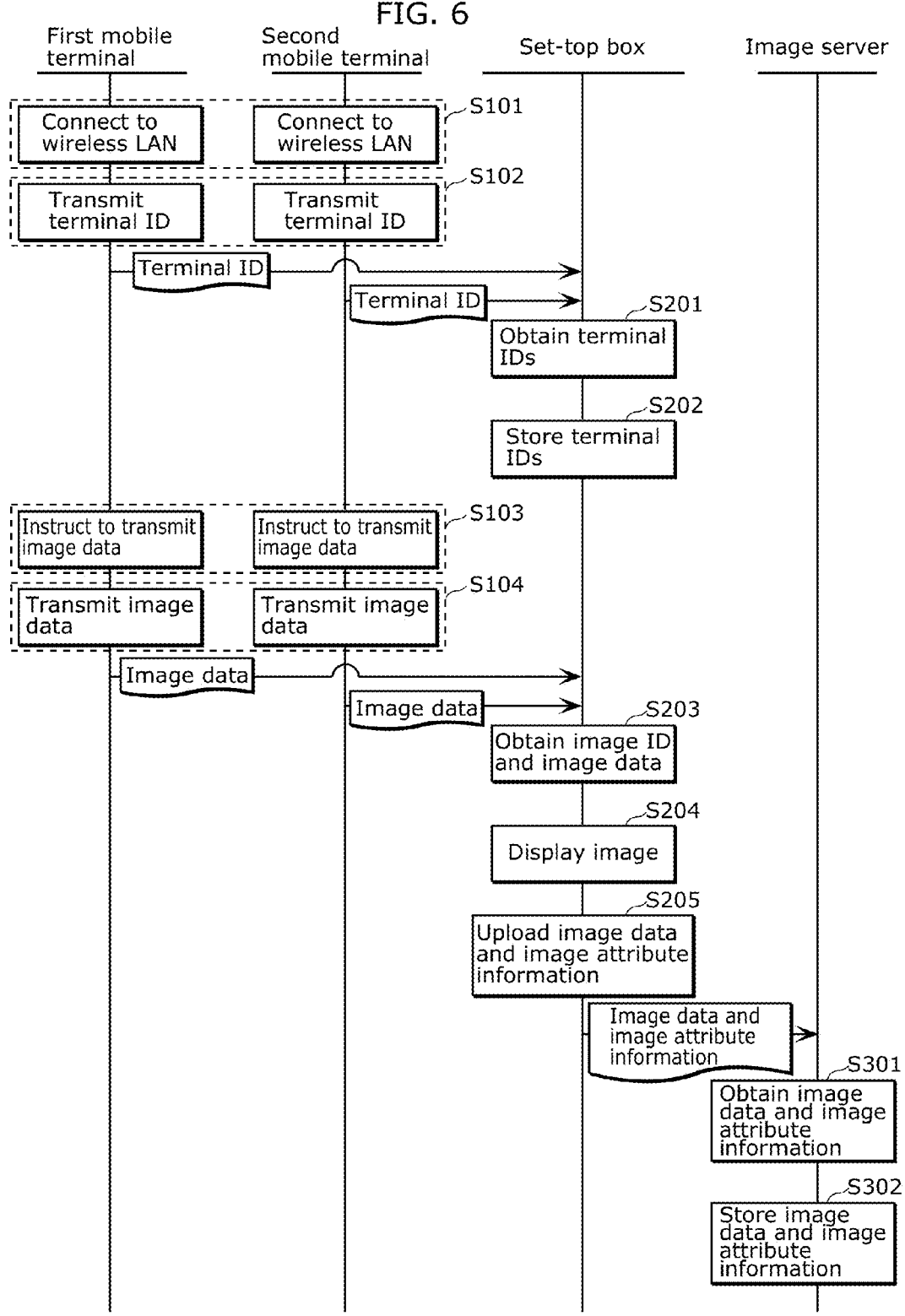
FIG. 6 is a sequence diagram showing an operation performed by the image viewing system.

Firstly, the operation performed by the large display apparatus when the mobile terminal instructs the large display apparatus to display the digital image is described, with reference to FIG. 3 and FIG. 6.

Here, the first mobile terminal 101 and the second mobile terminal 102 are connected to the large display apparatus 201 by a wireless LAN network of the wireless LAN station 204 (S101). The mobile terminals 101 and 102 connected to the wireless LAN network transmit the respective terminal IDs to the set-top box 203 (S102).

It should be noted that any kind of ID can be used as the aforementioned terminal ID as long as the ID can reliably identify the mobile terminal. For example, a wireless LAN device having a wireless LAN function such as a mobile terminal is assigned, for device identification, a MAC address that guarantees the uniqueness. Thus, such MAC addresses may be used as terminal IDs 305 and 306.

Next, the mobile terminal 101 instructs the set-top box 203 to display, on the large display apparatus 201, the digital image selected by the user (S103). In this operation, the respective image transmitting units 114 and 134 of the mobile terminals 101 and 102 transmit, to the set-top box 203, the image data indicating the images selected by the users together with respective image IDs 307 identifying the images (S104).

At the instant when the first mobile terminal 101 and the second mobile terminal 102 are connected to the wireless LAN network (S101 and S102), the terminal IDs 305 and 306 reliably unique to identify the respective mobile terminals are obtained by the ID transmitting unit 212 of the set-top box 203 of the large display apparatus 201 (S201). The terminal IDs obtained by the set-top box 203 are temporarily stored by the second memory unit 216 (S202).

Step S104 is performed by each of the mobile terminals 101 and 102, the second receiving unit 213 of the set-top box 203 obtains the image data together with the image IDs (S203). Then, the second display control unit 214 causes the large display 211 of the large flat-screen television 202 to display an image 301 indicated by the obtained image data (S204). Here, the obtained image data is temporarily stored in the second memory unit 216.

It should be noted that any kind of ID can be used as the aforementioned image ID as long as the ID can reliably identify the image. For example, the aforementioned terminal ID may be used as the image ID. More specifically, in this case, the image ID is formed of an upper digit indicating the terminal ID and a lower digit indicating the serial number of the digital image captured by the mobile terminal. When the image ID is set in this way, the uniqueness of the image ID can be guaranteed since the terminal ID of each mobile terminal is guaranteed to be unique.

The set-top box 203 displays the transferred digital image and, at the same time, uploads the image data indicating the digital image to the image server 103 via the Internet 105 (S205). In this operation, the ID transmitting unit 212 of the set-top box 203 uploads image attribute information 304 indexed by the image ID 307 as well, together with the image data. The image attribute information 304 is created by the ID transmitting unit 212, and includes "ID001" representing the terminal ID of the user terminal owning the current image data and an ID of a terminal which is allowed for viewing of the image indicated by the current image data (i.e., the viewing-allowed-terminal ID). In this case, the set-top box 203 knows that not only the first mobile terminal 101 owning the image (i.e., the mobile terminal in which the image is originally stored) but the second mobile terminal 102 is also connected. To be more specific, the set-top box 203 recognizes that the owner of the second mobile terminal 102 is also present in the same room to view the image (the image ID: IMG001) displayed on the large display apparatus 201. Thus, the image attribute information 304 is created to include, as the viewing-allowed-terminal ID for viewing the image with the image ID "IMG001", "ID002" which is the terminal ID of the second mobile terminal. Moreover, the ID transmitting unit 212 creates the image attribute information 304 to which the date and time when the image IMG001 is transferred from the first mobile terminal to the set-top box 203 is added as data and time of publication. Furthermore, the ID transmitting unit 212 includes, into the image attribute information 304, the viewing allowance information indicating whether the image data transmitted by the mobile terminal that is a transmission source of the image data is in the viewing-available state or the viewing-unavailable state. To be more specific, the ID transmitting unit 212 creates the image attribute information 304 in which the image ID of the image data, the owner terminal ID of the terminal owning the image data, the viewing-allowed-terminal ID corresponding to the image data, the viewing allowance information, and the date and time of publication are associated with each other. Note that the viewing allowance information is set to indicate the viewing-available state unless otherwise specifically set. However, when the viewing allowance information has been set by the user, the information may indicate the viewing-unavailable state according to this setting made by the user. This case is described in detail later in Embodiment 3.

The obtaining unit 151 of the image server 103 obtains the image data and the image attribute information 304 that includes the viewing-allowed-terminal ID and the viewing allowance information, which are transmitted by the set-top box 203 in Step S205 (S301). Then, the server memory unit 152 stores the image data and the image attribute information 304 obtained by the obtaining unit 151 (S302).

Next, the following describes the operation performed by the image viewing system 1 in the case where the owner of the second mobile terminal 102 intends to view the image IMG001 of the first mobile terminal on the second mobile terminal 102 again on the day following the day on which this owner viewed the image IMG001 on the large display apparatus 201, with reference to FIG. 4 and FIG. 7.

The owner of the second mobile terminal 102 enters an instruction to the input receiving unit 136 of the second mobile terminal 102 in order to view the image IMG001 that was viewed on the large display apparatus 201. Receiving this input, the second mobile terminal 102 connects to the image server 103 via the Internet 105 (S111). Then, the inquiry unit 132 inquires whether or not the image data of the image IMG001 is available for viewing. To be more specific, the inquiry unit 132 transmits a viewing request 310 for the current image to the image server 103 (S112). The viewing request 310 includes "ID002" which is the terminal ID of the second mobile terminal 102 and an image search condition indicating "Published within a week".

The obtaining unit 151 of the image server 103 obtains the viewing request 310 (S311). Then, the inquiry result transmitting unit 153 searches the image data uploaded to the image server 103 for the image IMG001 as follows. That is, the inquiry result transmitting unit 153 obtains the image IMG001, by searching for the image data: which includes, as the viewing-allowed-terminal ID, ID002 representing the terminal ID of the second mobile terminal 102; which has the viewing allowance information currently indicating "Available for viewing"; and which has been public for a week or less after the date and time of publication (S312).

The inquiry result transmitting unit 153 transmits, to the second mobile terminal 102, the image IMG001 together with the image attribute information as a result of the inquiry (S313). The second mobile terminal 102 causes the terminal memory unit 131 to store the image data and causes the small display 138 to display the image (S113). Here, the terminal memory unit 131 stores the image attribute information corresponding to the image data, together the image data.

Next, the operation performed in the case where, after the image IMG001 is made public, the publication of the image IMG001 is cancelled, with reference to FIG. 5 and FIG. 8.

When the operation for viewing the image IMG001 is performed, a message saying "Now being viewed by ID002" is displayed on the first mobile terminal 101 (S121). Suppose here that when seeing this message, the owner of the first mobile terminal 101 changes the mind about the publication of the image IMG001 and enters, to the input receiving unit 116, an input indicating an instruction for making the image private (S122). In this case, the first mobile terminal 101 is connected to the image server 103 via the Internet 105, and the change information transmitting unit 113 transmits a private request 400 as change information to the image server 103 (S123). Here, note that the private request 400 includes: ID001 representing the terminal ID of the first mobile terminal 101 that is a transmission source of the private request; and IMG001 representing the image ID of the image specified to be made private.

When the obtaining unit 151 of the image server 103 obtains the private request 400 (S321), the viewing allowance changing unit 154 obtains the image attribute information 304 corresponding to the private request 400 by searching for the image attribute information stored in the server memory unit 152 based on, as a key, IMG001 representing the image ID included in the private request 400 (S322). Then, the viewing allowance changing unit 154 determines whether or not the owner terminal ID in the image attribute information 304 is the same as ID001 representing the terminal ID of the terminal that issued the private request 400. When it is determined, as a result, that these IDs are the same, the viewing allowance changing unit 154 sets the viewing allowance information included in the image attribute information 304 to "Unavailable for viewing" (S323).

Suppose here that, after Step S323, the image IMG001 is viewed by the second mobile terminal 102. More specifically, suppose that the owner of the second mobile terminal 102 enters, to the input receiving unit 136, an instruction for viewing again the image IMG001 on the second mobile terminal 102 (S124). Receiving the input, the second mobile terminal 102 references to the image attribute information of the image already stored in the terminal memory unit 131 (S125). Then, when verifying that the owner terminal ID included in the image attribute information is not the terminal ID of the second mobile terminal 102 (S126), the second mobile terminal 102 connects to the image server 103 via the Internet 105 and transmits a viewing verification request 401 to the image server 103 (S127). The viewing verification request 401 includes: ID002 representing the terminal ID of the terminal that is a transmission source of this request; and IMG001 representing the image ID of the image to be viewed.

Here, suppose that the second mobile terminal 102 cannot be connected to the Internet 105. In this case, according to the latest image attribute information obtained as a result of the inquiry made about the image IMG001 stored in the terminal memory unit 131, the first display control unit 137 performs control for displaying, on the small display 138, the image IMG001 indicated by the image data selected on the basis of the input received by the input receiving unit 136. More specifically, in this case, the first display control unit 137 determines whether the viewing allowance information in the image attribute information of the image IMG001 indicates the viewing-available state or the viewing-unavailable state. In the case of the viewing-available state, the first display control unit 137 causes the small display 138 to display the image IMG001. In the case of the viewing-unavailable state, the first display control unit 137 performs control not to cause the small display 138 to display the image IMG001.

When the obtaining unit 151 of the image server 103 obtains the viewing verification request 401 (S324), the inquiry result transmitting unit 153 obtains the image attribute information 304 corresponding to the viewing verification request 401 by searching for the image attribute information based on, as a key, IMG001 included in the viewing verification request (S325). Then, the inquiry result transmitting unit 153 found out that although ID002 representing the terminal ID included in the viewing verification request 401 is included as the viewing-allowed-terminal ID, the viewing allowance information is set to "Unavailable for viewing" (S326). Thus, the inquiry result transmitting unit 153 transmits a private request 402 to the second mobile terminal 102 (S327).

When the first receiving unit 135 receives the private request 402 (S128), the second mobile terminal 102 causes a message saying "Made private upon owner's request" to be displayed in a region of the small display 138 for displaying the image IMG001 (S129). To be more specific, a notification indicating that the image has been made private is displayed on the small display 138 of the second mobile terminal 102.

It should be noted that, in Step S128, the first display control unit 117 may erase, from the terminal memory unit 131, the image data corresponding to IMG001 representing the image ID included in the private request 402. In this case, the image attribute information may not be stored in the terminal memory unit 131, and the image server 103 may not transmit the image attribute information together with the image data. Therefore, the case where the image data is erased from the terminal memory unit 131 is more preferable since the storage capacity of the terminal memory unit 131 can be prevented from being exhausted.

As described, a special advantageous effect can be achieved by the image viewing system 1 in Embodiment 1. More specifically, when the image data stored in the mobile terminal is to be shared by the mobile terminals, the mobile terminal with which the image data is to be shared can be remarkably easily set without the need to manually input the terminal ID of this mobile terminal. Moreover, the shared image is stored into the terminal memory unit of the receiver mobile terminal. On account of this, once the image is stored in the terminal memory unit, the receiver mobile terminal does not always have to connect to the image server when viewing the image. Thus, the image allowed to be viewed can be viewed even when the receiver mobile terminal cannot be connected to the Internet, and this is also a special advantageous effect.

Furthermore, according to the image viewing system 1 in Embodiment 1, even after the image data is stored into the receiver mobile terminal since the download of the image data from the image server 103 to the receiver mobile terminal is allowed, viewing of the digital image that is once made public can be restricted through an operation performed on the transmitter mobile terminal. With this, the inconvenience of having to connect to the Internet whenever the image data stored in the receiver mobile terminal is to be displayed by downloading the image data to view the digital image can be avoided. Moreover, this can achieve a special advantageous effect whereby the transmitter mobile terminal can make the image data private at any time even after the image data is made public.

It should be noted that the image viewing system 1 in Embodiment 1 is not limited to the embodiment described above and may have a different configuration. For example, it should be obvious that the mobile terminals 101 and 102 and the large display apparatus 201 may be connected via a cable LAN instead of the wireless LAN. Moreover, a different communication form such as Bluetooth (registered trademark) can be used instead of LAN. Furthermore, although the viewing-allowed-terminal ID is only ID002 representing the second mobile terminal 102, more than one viewing-allowed terminals including the second mobile terminal 102 may be present. For example, a preset group including the second mobile terminal 102 may be present. Alternatively, the publication may be allowed to a terminal having the same attribute as the attribute entered for ID002 representing the terminal ID of the second mobile terminal 102. Examples of such attribute include gender, age (that may have a range to some extent, such as an age group born in the 1960's), hobby, occupation, and address (that may be indicated by various levels such as town, city, prefecture, and country). It should be obvious that the publication may be allowed to a large indefinite number of terminals.

It should be noted that the image viewing system 1 in Embodiment 1 is not limited to the embodiment described above and may have a different configuration. In Embodiment 1, the viewing verification request 401 is issued to the image server 103 at the timing when the image is to be viewed on the second mobile terminal 102. However, the viewing verification request may be issued at the timing when the connection to the Internet 105 becomes available instead of the timing when the image is to be viewed. This case is more preferable because, even in the case where the connection to the Internet is unavailable when the image is to be viewed, the situation of the image server 103 at the time can be accurately reflected.

As described above, it is desirable for the image viewing system 1 in Embodiment 1 to manage the original owner of the image data stored in the terminal memory units 111 and 131 and operate to restrict the usage of the image data when the owner is different from the owner of the current mobile terminal. For example, the image viewing system 1 performs the operation not to allow the second mobile terminal 102 serving as the receiver mobile terminal to have a different user view, via the large display apparatus 201, the image IMG001 received from the first mobile terminal 101. This similarly applies to the case where the image is directly transferred to a different mobile terminal as described later in Embodiment 2. These restrictions are important because the intention of the original owner of the image IMG001, i.e., the intention that only the second mobile terminal 102 is allowed for viewing of the image, should be accomplished. It should be obvious that when the owner of the image IMG001 also allows a terminal other than the second mobile terminal 102 to view the image, viewing is not allowed to a terminal other than the terminals allowed by the owner of the image IMG001 and not only the second mobile terminal 102 is allowed for viewing of the image. Moreover, the owner of the image IMG001 may transfer the ownership right to the second mobile terminal 102 or may share the ownership right with the second mobile terminal 102. When the ownership right of the image IMG001 is transferred to a different owner or when the ownership right of the image IMG001 is shared with a different owner, this different owner is treated as the owner of the image IMG001. In other words, the terminal ID of the terminal owned by this different owner is to be included as the owner terminal ID of the image IMG001.

2. Embodiment 2

In Embodiment 1, when the image indicated by the image data stored in the mobile terminals 101 and 102 is to be viewed via the large display apparatus 201, the ID of the terminal which is allowed for viewing of the image uploaded to the image server 103 (i.e., the viewing-allowed-terminal ID) is automatically extracted. In Embodiment 2, on the other hand, image data is transferred between mobile terminals 101*a* and 102*a* without a large display apparatus 201.

Figure 9:
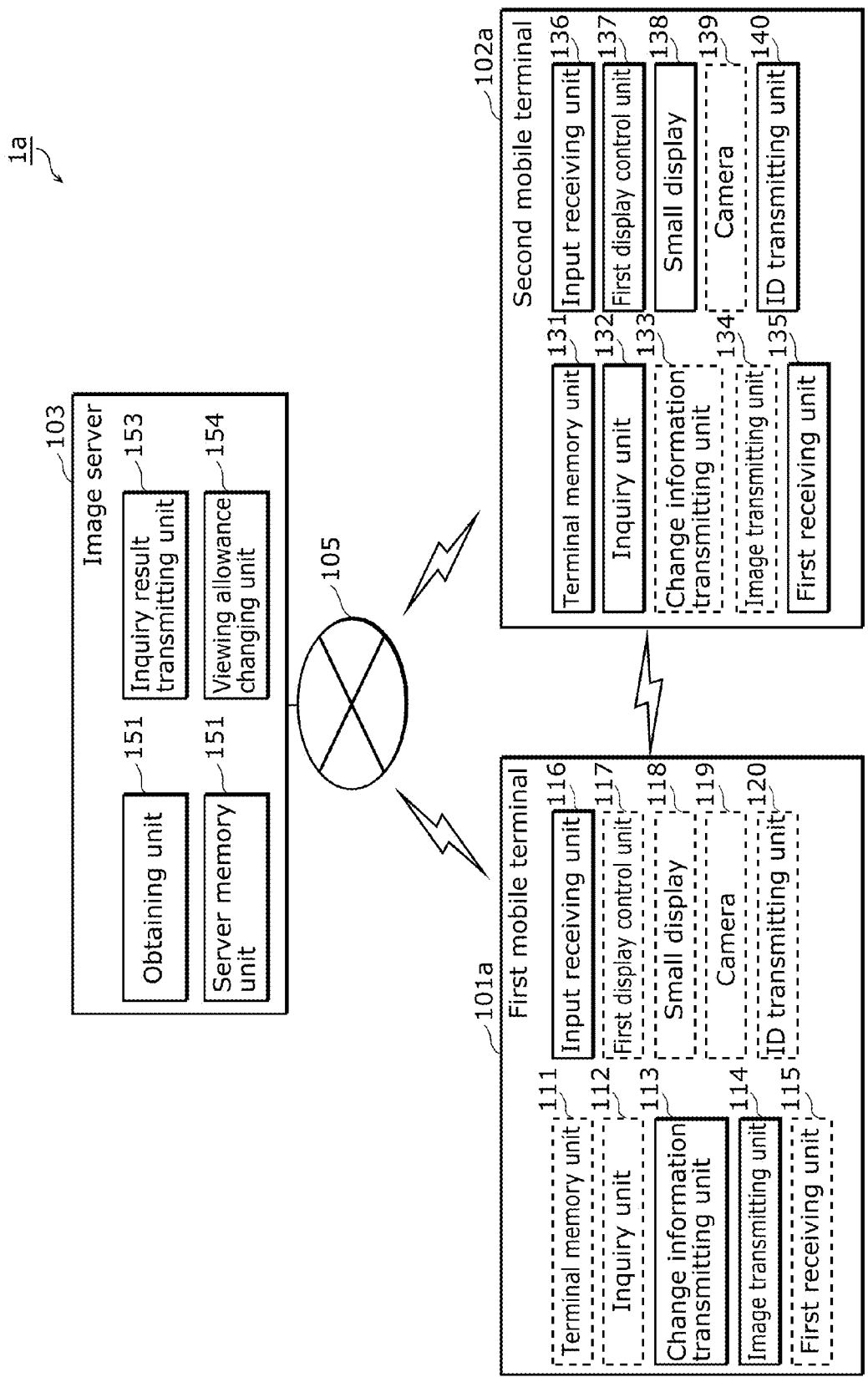
FIG. 9 is a functional block diagram of an image viewing system in Embodiment 2.
Figure 10:
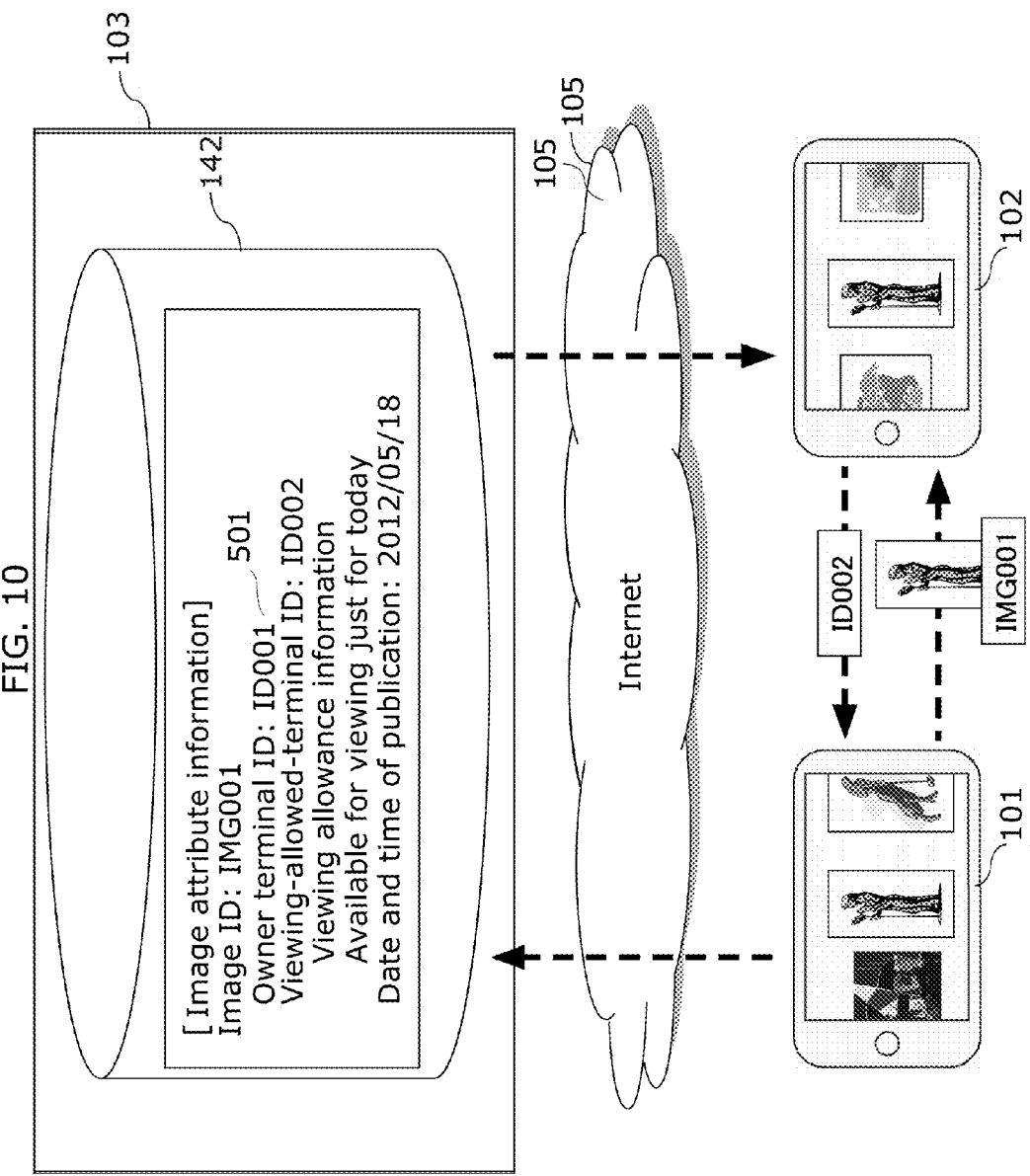
FIG. 10 is a diagram explaining an operation performed between a mobile terminal and an image server when a digital image is shared in the image viewing system in Embodiment 2.
Figure 11:
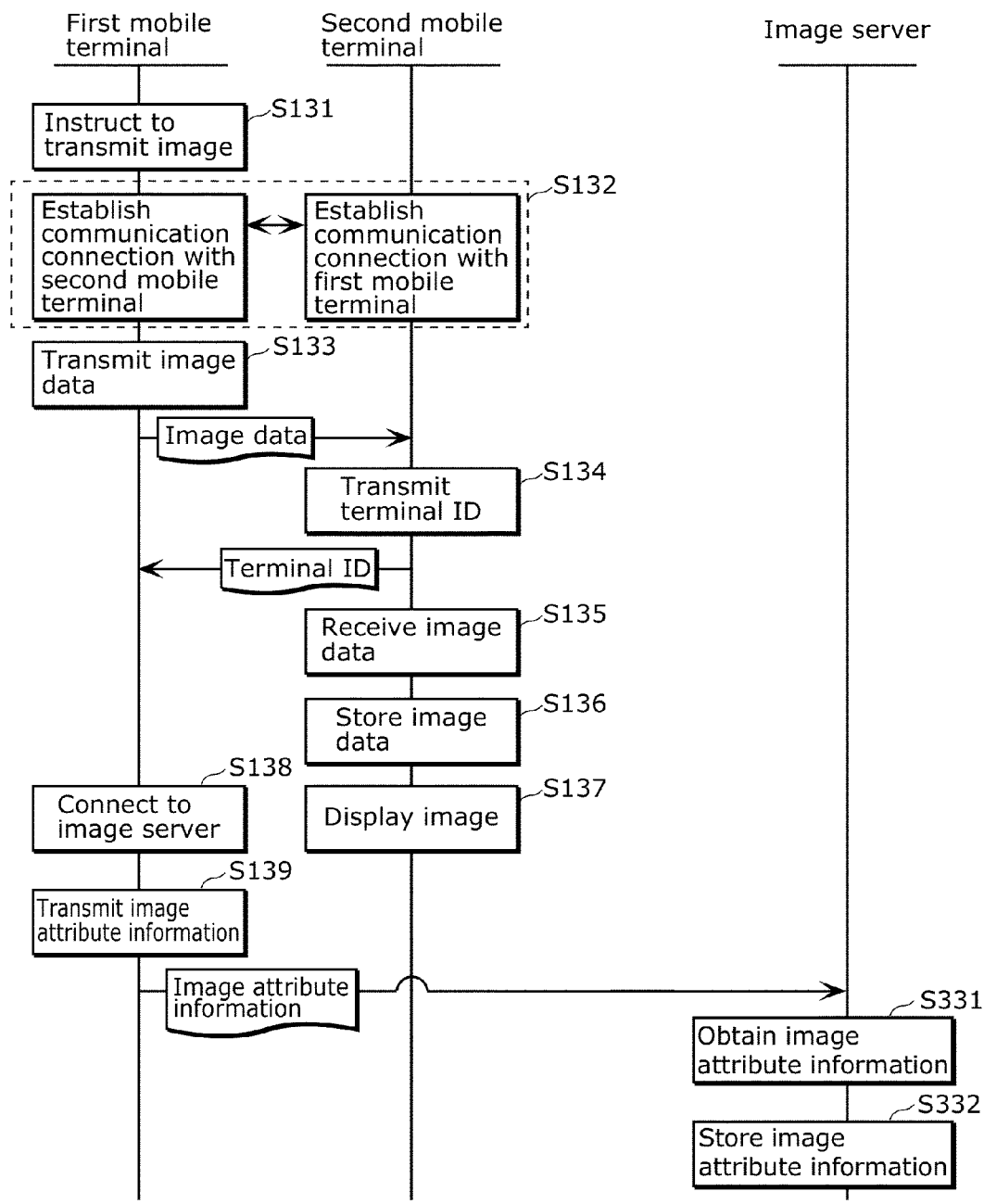
FIG. 11 is a sequence diagram showing an operation performed by the image viewing system in Embodiment 2.

FIG. 9 is a functional block diagram of an image viewing system in Embodiment 2. FIG. 10 is a diagram explaining an operation performed between the mobile terminals and an image server in the case where a digital image is shared in the image viewing system in Embodiment 2. FIG. 11 is a sequence diagram showing an operation performed by the image viewing system in Embodiment 2.

The following describes the case where the first mobile terminal 101*a* and the second mobile terminal 102*a* are brought in by the respective owners and an image IMG001 of the first mobile terminal 101*a* is to be transferred to the second mobile terminal 102*a*. More specifically, in Embodiment 2, too, the first mobile terminal 101*a* is described as a transmitter mobile terminal and the second mobile terminal 102*a* is described as a receiver mobile terminal.

As shown in FIG. 9, an image viewing system 1*a* in Embodiment 2 includes the mobile terminals 101*a* and 102*a* which further have ID transmitting units 120 and 140, respectively, in addition to the respective configurations of the mobile terminals 101 and 102 in Embodiment 1.

Each of the ID transmitting units 120 and 140 transmits, to an image server 103, a viewing-allowed-terminal ID that is set corresponding to image data and identifies a mobile terminal that is allowed for viewing of this image data.

Moreover, an image transmitting unit 114 of the first mobile terminal 101a serving as the transmitter transmits the image data to the second mobile terminal 102 serving as the receiver. Then, a first receiving unit 135 of the second mobile terminal 102a directly receives the image data transmitted by the first mobile terminal 101a.

In this case, the mobile terminals 101a and 102a may be connected to each other using an ad hoc mode of a wireless LAN or Bluetooth (registered trademark). For example, suppose that an image transmission instruction is entered with the push of a button or the like indicated as "Image transmission" displayed on a touch panel serving as an input receiving unit 116 and a small display 118 of the first mobile terminal 101a (S131). In this case, the first mobile terminal 101a is connected to a mobile terminal (the second mobile terminal 102a in this case) which is present near the first mobile terminal 101a and on which an application of the image viewing system is running (S132). When the first mobile terminal 101a is connected to the second mobile terminal 102a, the image transmitting unit 114 of the first mobile terminal 101a starts transmitting the image IMG001 to the second mobile terminal 102a (S133). At this time, an ID transmitting unit 139 of the second mobile terminal 102 transmits, to the first mobile terminal 101, ID002 representing the terminal ID identifying the present mobile terminal (S134). It should be noted that Step S133 and Step S134 may be performed at the same time or one of these two steps may be performed first.

The first receiving unit 135 receives the image data IMG001 transmitted by the image transmitting unit 114 (S135), and stores the received image data IMG001 into a terminal memory unit 131 of the second mobile terminal 102 (S136). Then, a first display control unit 137 causes the small display 138 to display an image indicated by the image data stored in the terminal memory unit 131 (S137).

On the other hand, the first mobile terminal 101a connects to the image server 103 via the Internet 105 (S138). Here, suppose that the first mobile terminal 101a has only one wireless LAN function and that the connection between the first mobile terminal 101a and the second mobile terminal 102 is achieved by the ad hoc mode of the wireless LAN. In this case, the first mobile terminal 101a cannot be connected to the Internet using the wireless LAN. On this account, the first mobile terminal 101a connects to the image server 103 via the Internet 105 using a data transfer function, such as 3G, included as a function of a mobile terminal. In the case of having a cable LAN function, the first mobile terminal 101a may connect to the Internet using this function. Various other connection methods can be used. To be more specific, the first mobile terminal 101a can establish communications with the second mobile terminal 102a and with the image server 103 at the same time by using different communication methods as described above.

When connected to the image server 103, the first mobile terminal 101a uploads image attribute information 501 to the image server 103 (S139). The image attribute information 501 refers to information concerning the image IMG001 transferred to the second mobile terminal 102, and is the same as the image attribute information 304 described in Embodiment 1. More specifically, the image attribute information 501 indicates that: the image ID is IMG001; the owner terminal ID is ID001; and the viewing-allowed-terminal ID is ID002. The image server 103 obtains the uploaded image attribute information 501 (S331) and stores the uploaded image attribute information 501 (S332).

An operation for viewing, on the second mobile terminal 102a, the image IMG001 transmitted in this way is the same as the operation of the second mobile terminal 102a (Steps S124 to S129) and the operation of the image server 103 (Steps S324 to S327) explained with reference to FIG. 5. To be more specific, at the timing when the image is to be viewed or at the timing when the second mobile terminal 102a is connected to the Internet, an inquiry unit 132 transmits a viewing verification request 401 as an inquiry to the image server 103 in order to inquire whether or not the image IMG001 is available for viewing. Then, based on a result of the inquiry transmitted by the image server 103, the first display control unit 137 causes the small display 138 of the second mobile terminal 102a to display the image IMG001 or controls displaying.

As described, according to the image viewing system 1a in Embodiment 2, even when the image data is transferred between the mobile terminals 101a and 102a, the viewing allowance information concerning the image viewing is uploaded to the image server 103. With this, a special advantageous effect can be achieved as follows. That is, the inconvenience of having to manually input the viewing-allowed-terminal ID identifying the terminal allowed for viewing of the image can be avoided, and the image can be made private at any time even after the image is made public.

In the image viewing system 1a according to Embodiment 2, the image data is directly transmitted and received between the mobile terminals 101a and 102a. However, this is not intended to be limiting. As in Embodiment 1, the transmitter mobile terminal (the first mobile terminal 101a, for example) may firstly upload the image data to the image server 103, and then the receiver mobile terminal (the second mobile terminal 102a, for example) may download the uploaded image data from the image server 103.

3. Embodiment 3

In Embodiments 1 and 2, when a digital image is made public to a different user via the large display apparatus 201 or to a different mobile terminal directly, a permanent viewing right of the digital image is given to this different user when the viewing allowance information indicates the viewing-available state. However, some images may not be allowed to be viewed by a different owner without the presence of the owner of the image although the images may be temporarily allowed to be viewed by the different owner with the presence of the owner of the image. An image viewing system 1b in Embodiment 3 manages such a digital image.

Figure 12:
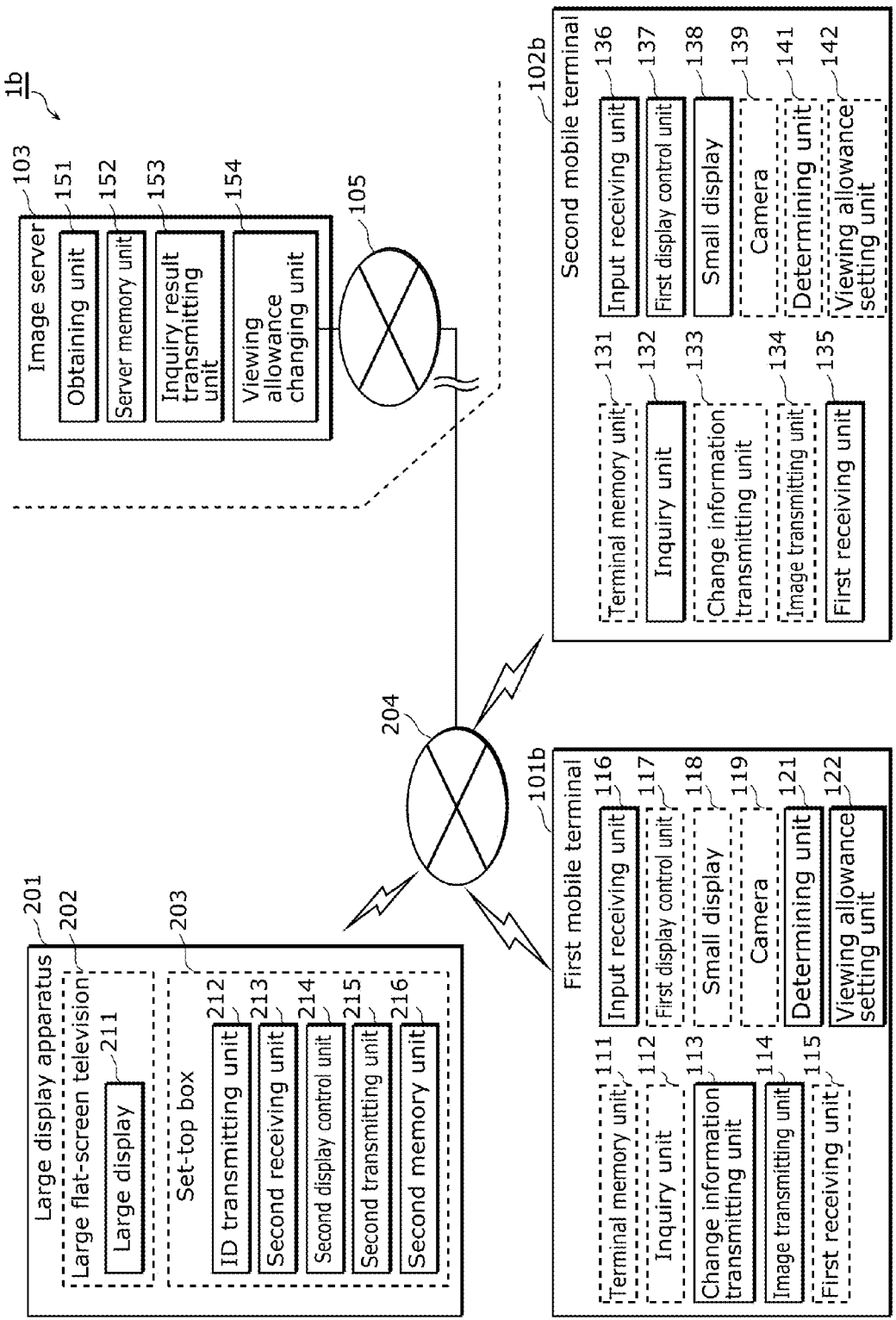
FIG. 12 is a functional block diagram of an image viewing system in Embodiment 3.

FIG. 12 is a functional block diagram of the image viewing system in Embodiment 3. FIG. 13 is a diagram explaining an operation performed by the image viewing system in Embodiment 3 and showing the case where a digital image that is not wished to be public is viewed via a large display apparatus.

As shown in FIG. 12, the image viewing system 1b in Embodiment 3 includes mobile terminals 101b and 102b which further have determining units 121 and 141 and viewing allowance setting units 122 and 142, respectively, in addition to the respective configurations of the mobile terminals 101 and 102 in Embodiment 1.

The determining units 121 and 141 determine whether or not an image indicated by image data stored in respective terminal memory units 111 and 131 is allowed to be made public. A specific basis for the determination made by the determining units 121 and 141 as to whether or not the image is allowed to be made public is described later.

When it is determined the image is allowed to be made public as a result of the determination made by the determining units 121 and 141, the viewing allowance setting units 122 and 142 set the state indicated by the viewing allowance information corresponding to the image data to the viewing-available state. When it is determined the image is not allowed to be made public as a result of the determination made by the determining units 121 and 141, the viewing allowance setting units 122 and 142 set the state indicated by the viewing allowance information corresponding to the image data to the viewing-unavailable state.

Then, in addition to transmitting the image data, image transmitting units 114 and 134 further transmit the viewing allowance information corresponding to the image data that is set by the viewing allowance setting units 122 and 142.

Moreover, a set-top box 203 has the following function. A second receiving unit 213 receives the image data and the viewing allowance information corresponding to the image data which are transmitted by the transmitter mobile terminal. When the viewing allowance information received by the second receiving unit 213 indicates the viewing-unavailable state, an ID transmitting unit 212 does not transmit the image data corresponding to this viewing allowance information.

FIG. 13 is a diagram explaining the case where the first mobile terminal 101b instructs the large display apparatus 201 to display the image data stored in the first mobile terminal 101b on a large flat-screen television 202. As shown in FIG. 13, when the determining unit 121 determines that the image indicated by the image data stored in the terminal memory unit 111 is not allowed to be made public, image attribute information in which the viewing allowance information corresponding to an image IMG001 indicates the viewing-unavailable state is transmitted to the set-top box 203. More specifically, an attribute "Non-public" 601 is assigned to the image IMG001 that is determined, by the determining unit 121, not to be allowed to be made public. When the large display apparatus 201 is instructed to display such an image that is determined, by the determining unit 121, not to be allowed to be made public, an indication "Non-public" 602 is superimposed in a partial region of an image 301 displayed on the large flat-screen television 202. Moreover, the image uploading to the image server 103 by the set-top box 203 via the Internet 105 as shown in FIG. 2 is not performed here.

The attribute "Non-public" 601 shown in FIG. 13 can be assigned in various ways. To be more specific, the determining units 121 and 141 determine whether image data stored in various manners in the respective terminal memory units 111 and 131 indicate an image that is allowed to be made public.

For example, suppose that each of the mobile terminals includes both an in-camera arranged on the small display side and an out-camera arranged on the opposite side of the in-camera. In this case, each of the determining units 121 and 141 may determine that an image is not allowed to be made public when the image is shot with the in-camera used for shooting the owner of the present mobile terminal and that an image is allowed to be made public when the image is shot with the out-camera used for shooting the other side of the present mobile terminal. In this case, it is reassuring for the owner of the mobile terminal to know that the face of the owner will not be made public by the image server.

Moreover, the determination for the image shot with the in-camera and the determination for the image shot with the out-camera may be made by the determining units 121 and 141 in a manner opposite to the aforementioned manner. This case has an advantageous effect that the determination is made automatically as follows. When the image is shot with the out-camera, it is determined that the image is not allowed to be made public because the image may infringe a copyright or violate portrait rights. When the image is the face of the owner, it is determined that the image is allowed to be made public by the image server because the face of the owner has no problems concerning a copyright or portrait rights.

Furthermore, when the camera function is activated, the determining units 121 and 141 may determine whether or not the shot image is allowed to be made public according to a touch gesture performed on a camera icon. To be more specific, when the camera icon is touched by swiping up the finger to shot an image for example, the image may be allowed to be made public to the image server 103. On the other hand, when the camera icon is touched by swiping down the finger to shot an image for example, the image may not be allowed to be made public to the image server 103.

Moreover, the determining units 121 and 141 may determine that an image taken badly is not allowed to be made public. For example, a representative face image of the owner is entered in advance as a reference image. After this, when the face image of the owner is shot with the mobile terminal, matching is performed between the reference image and the shot image to verify that the shot image is the face image of the owner. Then, a level of difference between the shot image and the reference image is checked. When the shot image is too different from the reference image, the determining units 121 and 141 may determine that this shot image is not allowed to be public. To be more specific, when at least a part of the image indicated by the image data obtained by shooting or by the image data stored in the terminal memory units 111 and 131 matches the pre-specified reference image, the determining units 121 and 141 determine that the present image is allowed to be made public. When the image indicated by the image data does not match the pre-specified reference image, the determining units 121 and 141 determine that the present image is not allowed to be made public. In this case, the determining units 121 and 141 determine that the present image is not allowed to be made public when a difference between the shot image and the reference image is larger than or equal to a predetermined threshold. On the other hand, the determining units 121 and 141 determine that the present image is allowed to be made public when the difference between the shot image and the reference image is smaller than the predetermined threshold. Here, suppose that the owner in the shot image does not look good due to a poor physical condition, that the owner in the shot image has bags under the eyes, or that the face of the owner in the shot image is finely wrinkled. In such a case, with the aforementioned function, an image significantly different from the representative face image of the owner because of the above reason is automatically prohibited from being made public. This function is highly ideal for the user who does not wish to make such an image public.

Furthermore, in the case where the luminance of the image is extremely low or extremely high as a result of image analysis, it is highly likely that the image is shot unsuccessfully. Therefore, the determining units 121 and 141 may assign an attribute indicating that the image is not allowed to be made public to the image server. Alternatively, when a region having a high sharpness in the image exceeds a first predetermined proportion, the determining units 121 and 141 may determine that the image is allowed to be made public. Otherwise, the determining units 121 and 141 may determine that the image is not allowed to be made public.

Moreover, in the case where the image is not worth being made public to the image server, such as the case of a screen-captured image obtained within the mobile terminal, the determining unit 121 and 141 may determine that this image is not allowed to be public. In this case, the determining units 121 and 141 may perform image analysis to determine the shot image as being a screen-captured image instead of a natural image, or may use a file format of the image. In general, the Joint Photographic Experts Group (JPEG) format is used for natural images, and the Portable Network Graphics (PNG) format, the Bitmap (BMP) format, or the like is used for screen captures and the like. Thus, based on these formats, the determining units 121 and 141 may determine whether or not the image is allowed to be made public.

Furthermore, the determining units 121 and 141 may determine whether or not the image is allowed to be made public to the image server 103, according to a type of input entered for displaying the specified image on the large display apparatus 201.

FIG. 14 is a diagram explaining the case where whether the image is allowed to be made public to the image server 103 is determined according to a type of a gesture input entered when the mobile terminals 101b and 102b instruct the large display apparatus 201 to display the image. In FIG. 14, (a) describes an operation of the case where a flick input is made with two fingers and (b) describes an operation of the case where a flick input is made with one finger.

In (a) of FIG. 14, the user performs, on the first mobile terminal 101b, a flick input 701 on a current image to be displayed on the large display apparatus 201, to instruct the large display apparatus 201 to display the current image. Here, the flick input 701 is performed by flicking with two fingers in the upper direction (to the direction of the large display apparatus 201). For example, in the case where the flick input with two fingers indicates the publication to the image server 103, the determining units 121 and 141 determine that the image to be displayed on the large display apparatus 201 in response to the flick input is allowed to be made public. When the determining unit 121 determines that the image is allowed to be made public, the viewing allowance setting unit 122 sets the state indicated by the viewing allowance information to the viewing-available state as described above. Accordingly, the set-top box 203 causes the large display 211 to display the image data for which the viewing allowance information is set to the viewing-available state, and uploads the image data to the image server 103 as well.

In (b) of FIG. 14, the user performs, on the first mobile terminal 101b, a flick input 702 on a current image to be displayed on the large display apparatus 201, to instruct the large display apparatus 201 to display the current image. Here, the flick input 702 is performed by flicking with one finger in the upper direction (to the direction of the large display apparatus 201). For example, unlike the flick input with two fingers, when the flick input with one finger is performed, the determining unit 121 determines that the current image is not allowed to be public. Thus, the publication of the image to the image server 103 is prohibited. A second display control unit 214 of the set-top box 203 causes only the large display 211 to display the image and causes the indication "Non-public" 602 to be displayed to indicate that the image is not made public by the image server 103.

To be more specific, according to the number of regions detected as being touched in the flick input performed for the image data, the determining units 121 and 141 determine whether or not the image indicated by the image data is allowed to be made public. Note that the determining units 121 and 141 may set different types of gesture inputs and determine whether or not the image data selected by the gesture input is allowed to be made public.

The prohibition of publication to the image server 103 may be performed according to a different method. For example, suppose that the transmission to the image server 103 has been started by some kind of operation even though the publication is not desired. In this case, while the image data is being transmitted to the image server 103, animation indicating the image data transmission is shown, such as animation where an image is flying to a cloud. Here, suppose that the user finds out, by watching the animation, that the image that the user does not wish to make public is being uploaded to the image server by an operational mistake made by the user. In this case, the transmission of the image data to the image server 103 may be cancelled by an intuitive operation, such as a gesture of pulling back the image flying to the cloud or a gesture of covering the upper part of the mobile terminal. More specifically, the luminance value detected by the in-camera becomes smaller than a predetermined luminance value, the transmission of the image data to the image server 103 may be stopped. Note that the aforementioned animation may be used not only during the actual transmission to the image server 103. For example, the animation may be started about 10 seconds before the start of the transmission to the image server 103. With this configuration, the user can have spare time to perform operation to cancel the transmission. This solve the problem that, since the transmission to the image server 103 is completed in a moment, the transmission cannot be cancelled and the data ends up being transmitted because the user has no time to perform the cancel operation. Here, as described, the transmission of the image data to the image server 103 is cancelled by covering the in-camera with the hand to reduce the luminance value by the in-camera while the animation is being displayed during the transmission of the image data. However, a target of transmission cancel is not limited to the image data transmission to the image server 103. For example, transmission of a created email may be cancelled. To be more specific, the process related to transmission cancel may be adopted not only by the image viewing system described above but also by a mobile terminal alone.

In the embodiments explained thus far, only the image data is described as a target of the operation. However, the present invention is not limited to the above embodiments. The target of the operation may be a different kind of data, such as video data, music data, or document data.

It should be noted that each of the structural elements in each of the above embodiments may be configured in the form of an exclusive hardware product or may be implemented by executing a software program suitable for the structural element. Each of the structural elements may be implemented by means of a program executing unit, such as a CPU or a processor, reading and executing the software program recorded on a recording medium such as hard disk or a semiconductor memory. Here, the software program for implementing the image viewing system and the like in each of the above embodiments is a program described below.

More specifically, this program causes a computer to execute an image viewing method used by an image viewing system including a transmitter mobile terminal, a receiver mobile terminal, an ID transmitting unit, and an image server which are connected to each other via a network, the image viewing method including: transmitting, by the transmitter mobile terminal, image data; transmitting, by the ID transmitting unit to the image server, a viewing-allowed-terminal ID that is set corresponding to the image data and identifies a mobile terminal allowed for viewing of the image data; obtaining, by the image server, the viewing-allowed-terminal ID transmitted by the ID transmitting unit and viewing allowance information indicating whether a state of the image data transmitted in the transmitting by the transmitter mobile terminal is a viewing-available state or a viewing-unavailable state; storing, by the image server, the viewing allowance information and the viewing-allowed-terminal ID obtained in the obtaining; receiving, by the receiver mobile terminal, the image data transmitted in the transmitting by the transmitter mobile terminal; and making an inquiry, by the receiver mobile terminal to the image server, as to whether or not the image data transmitted in the transmitting by the transmitter mobile terminal is available for viewing.

The image viewing system, the receiver mobile terminal, the image server, and the image viewing method in one or more aspects according to the present invention have been described. However, the present invention is not limited to these embodiments described above. Other embodiments implemented through various changes and modifications conceived by a person of ordinary skill in the art or through a combination of the structural elements in different embodiments described above may be included in the scope in an aspect or aspects according to the present invention, unless such changes, modifications, and combination depart from the scope of the present invention.

As described thus far, the present invention is useful as an image viewing system, a receiver mobile terminal, an image server, and an image viewing method which are capable of managing whether a digital image is made public or private and easily specifying a limited person or group only to which the digital image is made public.

REFERENCE SIGNS LIST

1 Image viewing system
101, 101a, 101b First mobile terminal
102, 102a, 102b Second mobile terminal
103 Image server
105 Internet
111, 131 Terminal memory unit
112, 132 Inquiry unit
113, 133 Change information transmitting unit
114, 134 image transmitting unit
115, 135 First receiving unit
116, 136 Input receiving unit
117, 137 First display control unit
118, 138 Small display
110, 139 Camera
120, 140, 212 ID transmitting unit
121, 141 Determining unit
122, 142 Viewing allowance setting unit
151 Obtaining unit
152 Server memory unit
153 Inquiry result transmitting unit
154 Viewing allowance changing unit
201 Large display apparatus
202 Large flat-screen television
203 Set-top box
204 Wireless LAN station
211 Large display
213 Second receiving unit
214 Second display control unit
215 Second transmitting unit
216 Second memory unit
301 Image
304 Image attribute information
310 Viewing request
400 Private request
401 Viewing verification request
402 Private request
501 Image attribute information
601 Attribute "Non-public"
602 Indication "Non-public"
701, 702 Flick input

The invention claimed is:

1. An image viewing system comprising:
a transmitter mobile terminal including an image transmitter configured to transmit image data;
an ID transmitter that determines a terminal connected to a same local area network (LAN) as a viewing-allowed terminal allowed for viewing of the image data, and transmits a viewing-allowed-terminal ID of the viewing-allowed terminal to an image server, the viewing-allowed-terminal ID being set corresponding to the image data;
the image server including (i) a hardware processor that obtains the viewing-allowed-terminal ID transmitted by the ID transmitter and viewing allowance information indicating whether a state of the image data transmitted by the transmitter mobile terminal is a viewing-available state or a viewing-unavailable state and (ii) a server memory configured to store the viewing allowance information and the viewing-allowed-terminal ID obtained by the obtaining unit; and
a receiver mobile terminal including (i) a hardware processor configured to receive the transmitted image data, and make an inquiry, to the image server, as to whether or not the image data is available for viewing, (ii) a small display, the hardware processor being configured to receive a predetermined input causing the small display to display an image indicated by the image data selected by a user, and (iii) a display controller configured to control displaying of the image on the small display according to a result of the inquiry, the image being selected by the predetermined input received,
wherein the inquiry by the hardware processor of the receiver mobile terminal makes the inquiry about the image data selected by the predetermined input, and
the display controller is configured (i) to cause the small display to display the image indicated by the image data when the result of the inquiry indicates that the receiver mobile terminal is allowed for viewing of the image data and (ii) cause the small display not to display the image indicated by the image data when the result of the inquiry indicates that the receiver mobile terminal is not allowed for viewing of the image data.

2. The image viewing system according to claim 1, wherein the receiver mobile terminal further includes
a terminal memory configured to store the image data received by the receiver mobile terminal and the result of the inquiry made about the image data, and
when the receiver mobile terminal is not connected to a network and receives the predetermined input, the display controller is configured to control displaying of the image on the small display according to a latest one of results of the inquiry made about the image data, the image being indicated by the image data and being selected by the predetermined input, and the results being stored in the terminal memory.

3. The image viewing system according to claim 1, wherein the hardware processor of image server is further configured to, when the the inquiry made is obtained,
(i) transmit, to the receiver mobile terminal in response to the inquiry, the result of the inquiry indicating that the image data is available for viewing in a case where the viewing allowance information corresponding to the image data about which the inquiry is made indicates the viewing-available state and a terminal ID of the receiver mobile terminal making the inquiry is included as the viewing-allowed-terminal ID corresponding to the image data, and (ii) transmit, to the receiver mobile terminal in response to the inquiry, the result of the inquiry indicating that the image data is unavailable for viewing in a case where the viewing allowance information corresponding to the image data about which the inquiry is made indicates the viewing-unavailable state or the terminal ID of the receiver mobile terminal making the inquiry is not included as the viewing-allowed-terminal ID corresponding to the image data.

4. The image viewing system according to claim 1, wherein the transmitter mobile terminal is further:
configured to receive an input from a user; and
configured to transmit change information used for changing the state of the image data set in the viewing allowance information from one state to another state, according to the input received,
the hardware processor of the image server is further configured to obtain the change information, and
the image server further
when the change information is obtained, changes the state of the image data set in the viewing allowance information corresponding to the change information obtained, from the one state to the other state.

5. The image viewing system according to claim 1, wherein the image transmitter is configured to transmit the image data to the image server, and
the receiver mobile terminal is configured to receive, via the image server, the image data transmitted by the transmitter mobile terminal.

6. The image viewing system according to claim 1, wherein the image transmitter is configured to transmit the image data to the receiver mobile terminal, and
the receiver mobile terminal is configured to directly receive the image data transmitted by the transmitter mobile terminal.

7. The image viewing system according to claim 1, wherein the transmitter mobile terminal is further:
configured to determine whether or not the image indicated by the image data is allowed to be made public; and
configured to (i) set the state indicated by the viewing allowance information corresponding to the image data to the viewing-available state when a result of the determination indicates that the image is allowed to be made public, and (ii) set the state indicated by the viewing allowance information corresponding to the image data to the viewing-unavailable state when a result of the determination indicates that the image is not allowed to be made public, and
the image transmitter is further configured to transmit the viewing allowance information corresponding to the image data that is set.

8. The image viewing system according to claim 7, wherein the ID transmitter is included in an independent apparatus separate from the transmitter mobile terminal, the receiver mobile terminal, and the image server,
the independent apparatus is further
configured to receive, from the transmitter mobile terminal, the image data and the viewing allowance information corresponding to the image data, and
the ID transmitter is configured not to transmit the image data corresponding to the viewing allowance information when the state indicated by the viewing allowance information received indicates the viewing-unavailable state.

9. The image viewing system according to claim 7, wherein the transmitter mobile terminal is further
configured to receive a flick input for transmitting the image indicated by the image data selected by a user out of the image data, and
is configured to determine whether or not the image indicated by the image data is allowed to be made public, according to a total number of regions detected as being touched in the flick input performed for the image data.

10. The image viewing system according to claim 7, wherein the transmitter mobile terminal is configured to determine that (i) the image is allowed to be made public when a region having a high sharpness in the image indicated by the image data exceeds a first predetermined proportion, and (ii) the image is not allowed to be made public when the region having the high sharpness in the image indicated by the image data is smaller than or equal to the first predetermined proportion.

11. The image viewing system according to claim 7, wherein the transmitter mobile terminal is configured to determine that (i) the image is allowed to be made public when at least a part of the image indicated by the image data matches a pre-specified image, and (ii) the image is not allowed to be made public when the image indicated by the image data does not match the pre-specified image.

12. The image viewing system according to claim 1, wherein the image server further stores the image data.

13. The image viewing system according to claim 1, wherein the ID transmitter is included in an independent apparatus separate from the transmitter mobile terminal, the receiver mobile terminal, and the image server.

14. The image viewing system according to claim 13, wherein the independent apparatus is further
configured to receive the image data transmitted by the transmitter mobile terminal, and
the ID transmitter is configured to transmit, to the image server, each of terminal IDs of all mobile terminals connected to the independent apparatus via a network as the viewing-allowed-terminal ID, when the independent apparatus receives the image data.

15. The image viewing system according to claim 1, wherein the transmitter mobile terminal further includes the ID transmitter.

16. A receiver mobile terminal included in the image viewing system according to claim 1, wherein the receiver mobile terminal is:
configured to receive the transmitted image data; and
configured to make an inquiry, to the image server, as to whether or not the image data is available for viewing.

17. An image server included in the image viewing system according to claim 1, the image server is:
configured to obtain the viewing-allowed-terminal ID transmitted by the ID transmitter and viewing allowance information indicating whether a state of the image data transmitted by the transmitter mobile terminal is a viewing-available state or a viewing-unavailable state;
includes a server memory configured to store the viewing allowance information and the viewing-allowed-terminal ID obtained; and
the image server is configured to, when receiving the inquiry made,
(i) transmit, to the receiver mobile terminal in response to the inquiry, the result of the inquiry indicating that the image data is available for viewing in a case where the viewing allowance information corresponding to the image data about which the inquiry is made indicates the viewing-available state and a terminal ID of the receiver mobile terminal making the inquiry is included as the viewing-allowed-terminal ID corresponding to the image data, and (ii) transmit, to the receiver mobile terminal in response to the inquiry, the result of the inquiry indicating that the image data is unavailable for viewing in a case where the viewing allowance information corresponding to the image data about which the inquiry is made indicates that the viewing-unavailable state or the terminal ID of the receiver mobile terminal making the inquiry is not included as the viewing-allowed-terminal ID corresponding to the image data.

18. An image viewing method used by an image viewing system including a transmitter mobile terminal, a receiver mobile terminal, an ID transmitter, and an image server which are connected to each other via a network, the image viewing method comprising:

transmitting, by the transmitter mobile terminal, image data;

determining by the ID transmitter a terminal connected to a same local area network (LAN) as a viewing-allowed terminal allowed for viewing of the image data, and transmitting by the ID transmitter a viewing-allowed-terminal ID of the viewing-allowed terminal to an image server, the viewing-allowed-terminal ID being set corresponding to the image data;

obtaining, by a hardware processor of the image server, the viewing-allowed-terminal ID transmitted by the ID transmitter and viewing allowance information indicating whether a state of the image data transmitted in the transmitting by the transmitter mobile terminal is a viewing-available state or a viewing-unavailable state;

storing, by a memory of the image server, the viewing allowance information and the viewing-allowed-terminal ID obtained in the obtaining;

receiving, by a hardware processor of the receiver mobile terminal, the image data transmitted in the transmitting by the transmitter mobile terminal;

making an inquiry, by the hardware processor of the receiver mobile terminal to the image server, as to whether or not the image data transmitted in the transmitting by the transmitter mobile terminal is available for viewing;

displaying by a small display of the receiver mobile terminal;

receiving by the hardware processor of the receiver mobile terminal a predetermined input causing the small display to display an image indicated by the image data selected by a user;

controlling by a display controller of the receiver mobile terminal displaying of the image on the small display according to a result of the inquiry, the image being selected by the predetermined input received, wherein the inquiry by the hardware processor of the receiver mobile terminal is made about the image data selected by the predetermined input, and the controlling by the display controller (i) causes the small display to display the image indicated by the image data when the result of the inquiry indicates that the receiver mobile terminal is allowed for viewing of the image data and (ii) causes the small display not to display the image indicated by the image data when the result of the inquiry indicates that the receiver mobile terminal is not allowed for viewing of the image data.

* * * * *